United States Patent
Chi et al.

(10) Patent No.: US 10,073,553 B2
(45) Date of Patent: Sep. 11, 2018

(54) SCRIPTING CROSS-DEVICE WEARABLE INTERACTION

(71) Applicant: Google LLC, Mountain View, CA (US)

(72) Inventors: Pei-Yu Chi, Sunnyvale, CA (US); Yang Li, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 462 days.

(21) Appl. No.: 14/860,669

(22) Filed: Sep. 21, 2015

(65) Prior Publication Data
US 2016/0085366 A1 Mar. 24, 2016

Related U.S. Application Data

(60) Provisional application No. 62/053,786, filed on Sep. 22, 2014.

(51) Int. Cl.
*G06F 3/041* (2006.01)
*G06F 3/0488* (2013.01)
*G06F 1/16* (2006.01)

(52) U.S. Cl.
CPC ............ *G06F 3/0416* (2013.01); *G06F 1/163* (2013.01); *G06F 3/0412* (2013.01); *G06F 3/0488* (2013.01)

(58) Field of Classification Search
CPC .... G06F 3/0416; G06F 3/0412; G06F 3/0488; G06F 1/163
See application file for complete search history.

(56) References Cited

U.S. PATENT DOCUMENTS

| | | | |
|---|---|---|---|
| 8,020,104 B2 * | 9/2011 | Robarts | G06F 1/163 706/45 |
| 8,032,461 B2 | 10/2011 | Winter et al. | |
| 8,228,825 B2 | 7/2012 | Yin et al. | |
| 2002/0054174 A1 * | 5/2002 | Abbott | G06F 1/163 715/863 |

(Continued)

OTHER PUBLICATIONS

Baldus et al.; "Human-Centric Connectivity Enables by Body-Coupled Communications"; IEEE Communications Magazine; Jun. 2009.*

(Continued)

*Primary Examiner* — Umut Onat
(74) *Attorney, Agent, or Firm* — McDonnell Boehnen Hulbert & Berghoff LLP

(57) ABSTRACT

Methods and apparatus for an interaction system specifying cross-device interaction are provided. The interaction system provides application program interfaces (APIs) and a scripting environment that allow development of scripts that combine user input and sensing events and distribute output and across devices to create a range of rich cross-device behaviors with minimal development. The interaction system includes an integrated environment for developers to author and test cross-device behaviors. When a script is ready, the script can be deployed on a network of mobile and wearable computing devices using the interaction system's runtime environment. An evaluation of the interaction system with twelve participants revealed that the interaction system significantly reduced developer effort for creating and iterating on cross-device behaviors. The interaction system allowed developers to focus on target interaction behaviors and high-level device capabilities, rather than low-level specifications.

25 Claims, 10 Drawing Sheets

(56) References Cited

U.S. PATENT DOCUMENTS

| | | | |
|---|---|---|---|
| 2003/0182469 | A1 | 9/2003 | Lok et al. |
| 2007/0078953 | A1 | 4/2007 | Chai et al. |
| 2011/0191823 | A1 | 8/2011 | Huibers |
| 2014/0070957 | A1* | 3/2014 | Longinotti-Buitoni ..................... A61B 5/02055 340/870.01 |
| 2014/0258880 | A1* | 9/2014 | Holm ..................... H04L 65/40 715/748 |
| 2015/0280818 | A1* | 10/2015 | Walma ................. H04B 10/116 398/118 |

OTHER PUBLICATIONS

Zimmerman; "Personal Area Networks: Near-Field Intrabody Communication"; IBM Systems Journal, vol. 35, Nos. 3&4; 1996.*

Apple, Inc., "IOS8—Continuity", Sep. 9, 2014, available via the Internet at web.archive.org/web/20140909223510/http://www.apple.com/ios/whats-new/continuity/ (last viisted Oct. 22, 2015).

S. Boring et al, "Touch projector: Mobile Interaction through Video", Apr. 10, 2010, Proceedings of ACM Conference on Human Factors in Computing Systems (CHI) 2010, pp. 2287-2296, ACM Press.

M. Bostock et al., "D3: Data-Driven Documents", IEEE Transactions on Visualization and Computer Graphics, Dec. 2011, pp. 2301-2309, vol. 17, Issue 12.

X. Chen et al., "Extending a mobile device's interaction space through body-centric interaction", Sep. 21, 2012, Proceedings of the 14th International Conference on Human-Computer Interaction with Mobile Devices and Services 2012, ACM Press.

X. Chen et al., "Duet: Exploring Joint Interactions on a Smart Phone and a Smart Watch", Apr. 26, 2014, ACM Conference on Human Factors in Computing Systems (CHI) 2014, pp. 159-168, ACM Press.

D. Dearman et al.,"'It's on my other computer!': Computing with Multiple Devices", Apr. 5, 2008, Proceedings of ACM Conference on Human Factors in Computing Systems (CHI) 2008, pp. 767-776, ACM Press.

W. K. Edwards et al., "Using Speakeasy for Ad Hoc Peer-to-Peer Collaboration", Nov. 16, 2002, Proceedings of the 2002 ACM Conference on Computer Supported Cooperative Work, pp. 256-265, ACM Press.

N. Elmqvist, "Distributed User Interfaces: State of the Art", Distributed User Interfaces, 2011, Chapter 1, pp. 1-12, Springer.

S. Feiner et al., "Hybrid User Interfaces: Breeding Virtually Bigger Interfaces for Physically Smaller Computers", Nov. 11, 1991, Proceedings of the 4th Annual ACM Symposium on User Interface Software and Technology, pp. 9-17, ACM Press.

Fitbit Inc., "Fitbit Flex", Jan. 31, 2014, available via the Internet at web.archive.org/web/20140131060341/http://www.filbit.com/flex (last visited Oct. 22, 2015).

L. Frosini et al., "User Interface Distribution in Multi-Device and Multi-User Environments with Dynamically Migrating Engines", Jun. 17, 2014, Proceedings of the 2014 ACM SIGCHI Symposium on Engineering Interactive Computing Systems, pp. 55-64, ACM Press.

G. Ghiani et al., "Push and Pull of Web User Interfaces in Multi-Device Environments", May 21, 2012, Proceedings of the International Working Conference on Advanced Visual Interfaces, pp. 10-17, ACM Press.

T.Gjerlufsen et al., "Shared Substance: Developing Flexible Multi-Surface Applications", May 7, 2011, Proceedings of ACM Conference on Human Factors in Computing Systems (CHI) 2011, pp. 3383-3392, ACM Press.

Google Inc., "Android Wear", Jun. 30, 2014, available via the Internet at web.archive.org/web/20140630080034/http://developer.android.com/design/wear/index.html (last visited Oct. 22, 2015).

Google Inc., "Chromecast", Apr. 29, 2014, available via the Internet at web.archive.org/web/20140429215351/http://www.google.com/chrome/devices/chromecast (last visited Oct. 22, 2015).

Google Inc., "Glass Developers—Patterns", Apr. 29, 2014, available via the Internet at web.archive.org/web/20140219090801/https://developers.google.com/glass/design/patterns (last visited Oct. 22, 2015).

Google Inc., "Google Glass—What it Does", Apr. 29, 2014, available via the Internet at web.archive.org/web/20140101170448/http://www.google.com/glass/start/what-it-does/ (last visited Oct. 22, 2015).

P. Hamilton et al., "Conductor: Enabling and Understanding Cross-Device Interaction", Apr. 26, 2014, Proceedings of ACM Conference on Human Factors in Computing Systems (CHI) 2014, pp. 2773-2782, ACM Press.

C. Harrison et al., "Skinput: Appropriating the Body as an Input Surface", Apr. 10, 2010, Proceedings of ACM Conference on Human Factors in Computing Systems (CHI) 2010, pp. 453-462, ACM Press.

B. Hartmann et al., "HydraScope: Creating Multi-Surface Meta-Applications Through View Synchronization and Input Multiplexing", Jun. 4, 2013, Proceedings of the 2nd ACM International Symposium on Pervasive Displays, pp. 43-48, ACM Press.

J. Hernandez et al., "BioGlass: Physiological Parameter Estimation Using a Head-mounted Wearable Device", Nov. 3, 2014, Proceedings of 2014 EAI 4th International Conference on Wireless Mobile Communication and Healthcare (Mobihealth), pp. 55-58, IEEE.

S. Ishimaru et al., "In the Blink of an Eye—Combining Head Motion and Eye Blink Frequency for Activity Recognition with Google Glass", Mar. 7, 2014, Proceedings of the 5th Augmented Human International Conference, Article #15, ACM Press.

D. Laverde, "Android Wear 1.0 Primer", Aug. 24, 2014, available via the Internet at docs.google.com/presentation/d/1D5i9_ebEyktaov7o1xMxu7W_nWV14-4g1mZjUoW4Yn0/edit#slide=id.g183f63059_1131 (last visited Oct. 22, 2015).

K. Luyten et al., "Meta-GUI-Builders: Generating Domain-specific Interface Builders for Multi-Device User Interface Creation", Apr. 5, 2008, Proceedings of ACM Conference on Human Factors in Computing Systems (CHI) 2008, pp. 3189-3194 ACM Press.

N. Marquardt et al., "Cross-Device Interaction via Micro-mobility and F-formations", Oct. 7, 2012, Proceedings of the 25th Annual ACM Symposium on User Interface Software and Technology, pp. 13-22, ACM Press.

N. Marquardt et al., "The Proximity Toolkit: Prototyping Proxemic Interactions in Ubiquitous Computing Ecologies", Oct. 16, 2011, Proceedings of the 24th Annual ACM Symposium on User Interface Software and Technology, pp. 315-326, ACM Press.

S. Mayer et al., "User Interfaces for Smart Things—A Generative Approach with Semantic Interaction Descriptions", Feb. 2014, ACM Transactions on Computer-Human Interaction, vol. 21, No. 2, Article 12.

M. Nebeling et al, "XDKinect: Development Framework for Cross-Device Interaction using Kinect", Jun. 17, 2014, Proceedings of the 2014 ACM SIGCHI Symposium on Engineering Interactive Computing Systems, pp. 65-74, ACM Press.

M. Nebeling et al, "Interactive Development of Cross-Device User Interfaces", Apr. 26, 2014, ACM Conference on Human Factors in Computing Systems (CHI) 2014, pp. 2793-2802, ACM Press.

M. W. Newman et al., "Providing an Integrated User Experience of Networked Media, Devices, and Services Through End-User Composition", May 19, 2008, Proceedings of the 6th International Conference on Pervasive Computing, pp. 213-227, Springer-Verlag.

M. W. Newman et al.,"Designing for Serendipity: Supporting End-User Configuration of Ubiquitous Computing Environments", Jun. 25, 2002, Proceedings of the 4th Conference on Designing Interactive Systems: Processes, Practices, Methods, and Techniques, pp. 147-156, ACM Press.

F. Paterno et al., "MARIA: A Universal, Declarative, Multiple Abstraction-Level Language for Service-Oriented Applications in Ubiquitous Environment", Nov. 2009,ACM Transactions on Computer-Human Interaction, vol. 16, No. 4, Article 19, ACM Press.

J.S. Pierce et al., "An Infrastructure for Extending Applications' User Experiences Across Multiple Personal Devices", Oct. 19, 2008, Proceedings of the 21st Annual ACM Symposium on User Interface Software and Technology, pp. 101-110, ACM Press.

(56) References Cited

OTHER PUBLICATIONS

C. Rich et al., "DiamondHelp: A New Interaction Design for Networked Home Appliances", Apr. 2006, Personal and Ubiquitous Computing, vol. 10, Issue 2-3, pp. 187-190, Springer-Verlag.

S. Santosa et al, "A Field Study of Multi-Device Workflows in Distributed Workspaces", Sep. 8, 2013, Proceedings of the 2013 ACM International Joint Conference on Pervasive and Ubiquitous Computing, pp. 63-72, ACM Press.

D. Schmidt et al., "PhoneTouch: A Technique for Direct Phone Interaction on Surfaces", Oct. 3, 2010, Proceedings of the 23nd Annual ACM Symposium on User Interface Software and Technology, pp. 13-16, ACM Press.

D. Schmidt et al., "A Cross-Device Interaction Style for Mobiles and Surfaces", Jun. 11, 2012, Proceedings of the Designing Interactive Systems Conference, pp. 318-327, ACM Press.

M. Serrano et al., "Exploring the Use of Hand-To-Face Input for Interacting with Head-Worn Displays", Apr. 26, 2014, ACM Conference on Human Factors in Computing Systems (CHI) 2014, pp. 3181-3190, ACM Press.

A. K. Sinha, "Informally Prototyping Multimodal, Multidevice User Interfaces", May 23, 2003, Ph.D. Dissertation, The University of California Berkeley, Berkeley, California.

J. Wagner et al., "Body-centric Design Space for Multi-surface Interaction", Apr. 27, 2013, ACM Conference on Human Factors in Computing Systems (CHI) 2013, pp. 1299-1308, ACM Press.

M. Weiser et al., "The Coming Age of Calm Technology[1]", Oct. 5, 1996, Beyond Calculation, pp. 75-85, Copernicus.

D. Wigdor et al., "WeSpace: The Design, Development, and Deployment of a Walk-Up and Share Multi-Surface Collaboration System", Apr. 4, 2009, ACM Conference on Human Factors in Computing Systems (CHI) 2009, pp. 1237-1246, ACM Press.

Wikimedia Foundation, "Responsive Web Design", Oct. 22, 2015, available via the Internet at en.wikipedia.org/wiki/Responsive_web_design (last visited Oct. 22, 2015).

A. D. Wilson et al., "Combining Multiple Depth Cameras and Projectors for Interactions on, Above, and Between Surfaces", Oct. 6, 2010, Proceedings of the 23nd Annual ACM Symposium on User Interface Software and Technology, pp. 273-282, ACM Press.

S. Xanthopoulos et al., "A Comparative Analysis of Cross-platform Development Approaches for Mobile Applications", Sep. 19, 2013, Proceedings of the 6th Balkan Conference in Informatics, pp. 213-220, ACM Press.

J. Yang et al., "Panelrama: Enabling Easy Specification of Cross-Device Web Applications", Apr. 26, 2014, ACM Conference on Human Factors in Computing Systems (CHI) 2014, pp. 2783-2792, ACM Press.

M. Yin et al., "Phone N' Computer (PnC) Teaming up an Information Appliance with a PC", Oct. 2010, Personal and Ubiquitous Computing, vol. 14, Issue 7, pp. 601-607, Springer-Verlag.

B. Zhang et al., "HOBS: Head Orientation-Based Selection in Physical Spaces", Oct. 4, 2014, Proceedings of the 2nd ACM Symposium on Spatial User Interaction, pp. 17-25, ACM Press.

* cited by examiner ated, by the interaction system, the first designated device to perform the first operation.

SCRIPTING CROSS-DEVICE WEARABLE INTERACTION

CROSS-REFERENCE TO RELATED APPLICATIONS

This application claims priority to U.S. Patent App. No. 62/053,786, entitled "Scripting Cross-Device Wearable Interaction", filed Sep. 22, 2014, the contents of which are fully incorporated by reference herein for all purposes.

BACKGROUND

Unless otherwise indicated herein, the materials described in this section are not prior art to the claims in this application and are not admitted to be prior art by inclusion in this section.

The advance of computing technologies has introduced increasing numbers of personal and wearable devices that have formed an ecosystem of multiple intelligent gadgets in daily living. Examples of these personal and wearable devices include smartwatches, head-mountable devices (HMDs), and smartphones. Each of these example devices has different characteristics: a smartwatch can provide information at a glance and quick access to data; an HMD can enable users to navigate private and prompt content; and a smartphone is a powerful tool to complete various tasks. Both individual device usage scenarios and cross-device usage scenarios have been considered.

SUMMARY

In one aspect, a method is provided. An interaction system executing on a particular computing device receives a script. The interaction system is configured to communicatively couple to one or more other computing devices. The interaction system executes the script, where the script, when executed by the interaction system, is configured to cause the interaction system to perform interaction-system functions. The interaction-system functions include: selecting, by the interaction system, a first set of two or more devices based on one or more first selection criteria provided in the script, where the first set of two or more devices is selected from the particular computing device and the one or more other computing devices, and where the one or more first selection criteria include a body-centric criterion indicating a location on a body; determining, by the interaction system, that a first event has occurred, the first event related to a first designated device of the first set of two or more devices, in response to the first event, determining, by the interaction system, a first operation to perform on the first designated device, and instructing, by the interaction system, the first designated device to perform the first operation.

In another aspect, a computing device is provided. The computing device includes a processor and a non-transitory computer readable medium. The non-transitory computer readable medium is configured to store executable instructions for at least an interaction system. The interaction system is configured to communicatively couple to one or more other computing devices. The executable instructions, when executed by the processor, cause the interaction system of the computing device at least to perform functions. The functions include: receive a script at the interaction system and execute the script using the interaction system, where the script is configured to cause the interaction system to perform interaction-system functions. The interaction-system functions include: selecting, by the interaction system, a first set of two or more devices based on one or more first selection criteria provided in the script, wherein the first set of two or more devices is selected from the computing device and the one or more other computing devices, and the one or more first selection criteria include a body-centric criterion indicating a location on a body, determining, by the interaction system, that a first event has occurred, the first event related to a first designated device of the first set of two or more devices, in response to the first event, determining, by the interaction system, a first operation to perform on the first designated device, and instructing, by the interaction system, the first designated device to perform the first operation.

In another aspect, a computer readable medium is provided. The computer readable medium is configured to store at least executable instructions. The executable instructions, when executed by a processor of a computing device, cause the computing device to perform functions. The functions include: receiving a script at an interaction system executing on the computing device, where the interaction system is configured to communicatively couple to one or more other computing devices, and where the first set of two or more devices includes the computing device; executing the script using the interaction system, where the script is configured to cause the interaction system to perform interaction-system functions. The interaction-system functions include: selecting, by the interaction system, a first set of two or more devices based on one or more first selection criteria provided in the script, where the first set of two or more devices is selected from the computing device and the one or more other computing devices, and where the one or more first selection criteria include a body-centric criterion indicating a location on a body, determining, by the interaction system, that a first event has occurred, the first event related to a first designated device of the first set of two or more devices, in response to the first event, determining, by the interaction system, a first operation to perform on the first designated device, and instructing, by the interaction system, the first designated device to perform the first operation.

In another aspect, a computing device is provided. The computing device includes: means for receiving a script at an interaction system executing on the computing device, where the interaction system is configured to communicatively couple to one or more other computing devices; and means for executing the script using the interaction system, where the script is configured to cause the interaction system to perform interaction-system functions. The interaction-system functions include: selecting, by the interaction system, a first set of two or more devices based on one or more first selection criteria provided in the script, where the first set of two or more devices is selected from the computing device and the one or more other computing devices, and where the one or more first selection criteria include a body-centric criterion indicating a location on a body, determining, by the interaction system, that a first event has occurred, the first event related to a first designated device of the first set of two or more devices, in response to the first event, determining, by the interaction system, a first operation to perform on the first designated device, and instructing, by the interaction system, the first designated device to perform the first operation.

DETAILED DESCRIPTION

Scripting Cross-Device Interaction

Figure 1:
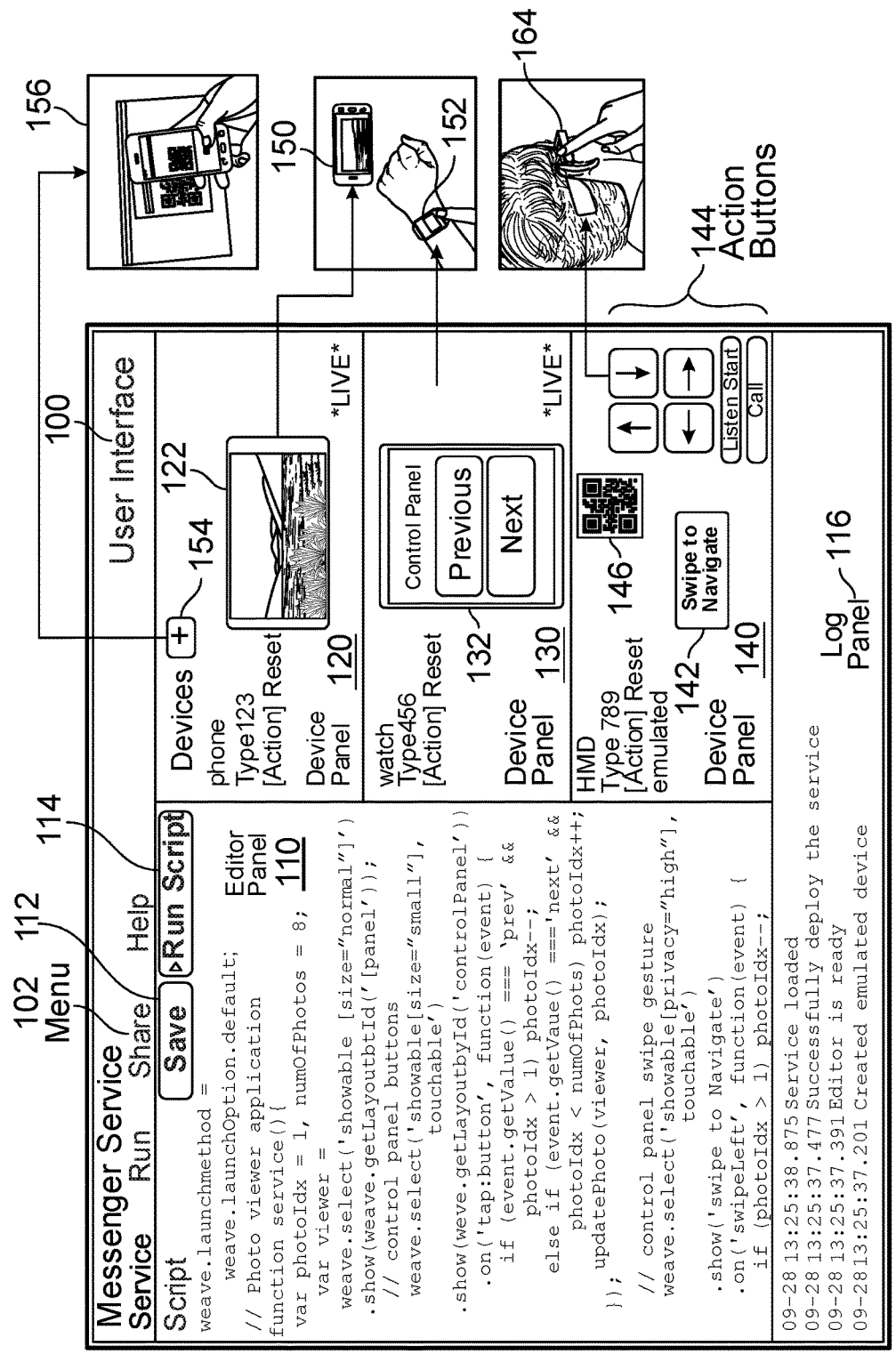
FIG. 1 shows an example user interface for an interaction system, in accordance with an example embodiment.

The prevalence of mobile and wearable computing devices provides a great potential for rich interaction behaviors. This potential can be multiplied when the unique capabilities of these devices are combined. Research has shown novel possibilities including joint interactions and distributing UI panels to several mobile displays. These possibilities demonstrate the promising opportunities of designing action-based interactions across wearable devices.

However, programming cross-device interaction remains challenging. To create an interaction behavior that spans multiple computing devices, software developers have to design and implement the behavior based on input resources, output resources, and preferred interaction styles of each individual device. Software developers typically distribute user interfaces and synthesize user input across devices. Realizing these tasks manually involves resolving many low-level details; e.g., device-specific constraints, per-device resources, and communication and synchronization across devices. These details can be technically challenging and time consuming to implement. Expending a large amount of effort to program cross-device behaviors can lead to an interactive system that is difficult to maintain, does not readily adapt to new types of devices, and fails to recognize or account for device combinations actually available at a time that the script is executed.

To address these and other issues, herein is described a flexible, simple interaction system that enables services to run across wearable and other computing devices with considerable flexibility to adapt to ad-hoc configurations of computing devices; such as head-mountable devices (HMDs), smartphones, and smartwatches. As used herein a computing device is any machine performing calculations automatically, such as computing device 700 described below in the context of FIG. 7A.

The interaction system includes a set of abstractions and application programming interfaces (APIs) that can be used create scripts to program the high-level application logic and UI layouts. The APIs and abstractions can be used to simplify event handling across devices and so allow software developers to focus on creating new services and high-level device capabilities.

The interaction system also contributes an integrated environment for software developers to author and test software scripts that specify cross-device behaviors, and when ready, deploy these behaviors to a runtime environment on the user's local ad-hoc network of computing devices. The interaction system can be used to create a range of rich cross-device behaviors with minimal effort. Moreover, the interaction system considers body-based characteristics of wearable devices, including glanceability and privacy. As described herein, a body is a physical structure of a person or animal, and a body-based characteristic (or criterion) is a characteristic (or criterion) of a body; e.g., the characteristic of having a head, hand, or other body part. Such body-based characteristics and criteria can be used to locate wearable devices; e.g., a body-based criterion related to a wrist can be used to locate a wearable device configured as a smart watch. By providing a responsive UI design and a programming environment, the interaction system assists software developers in monitoring devices and providing real-time feedback based on the device design principles.

The interaction system can be highly relevant to the efforts for multi-device interaction, particularly a collection of mobile devices utilized and/or worn by a single user, by providing efficient techniques that allow creation of rich cross-device behaviors. In particular, the interaction system can flexibly configure devices in real-time to ease scaling up the system. A future wearable device can be quickly deployed using the herein-described interaction system. Using the interaction system, a software developer or designer can program complex cross-device behaviors at a high level without having to manage all of the underlying complexity of ad-hoc networks and individual devices in a network.

The interaction system manages scripts and deploys instructions to wearable devices available on users' local network, such as a smartwatch. Moreover, software developers can manipulate the device behaviors by unifying several devices or combining some or all networked devices for interacting between combined devices. To help users track the subscribed events, the interaction system monitors the device status and provides feedback on a development UI in real-time. The interaction system includes support for developing interaction scripts that operate across multiple devices, managing specific device details, testing the scripts on emulated and/or actual devices, and for executing the interaction scripts to perform multi-device operations, such as input/output operations.

The interaction system utilizes a novel approach for programming event-based cross-device interactions, which allows software developers to focus on target interaction behaviors and high-level device capabilities rather than low-level details. The interaction system provides a set of high-level abstractions and APIs that capture body-based and other characteristics of computing devices, and provides mechanisms for distributing UI output, combining user input, and sensing events, across multiple computing devices.

The interaction system can include a web-based programming environment that allows software developers to author and test cross-device interaction anywhere and anytime, with emulated or real devices. The interaction system can have a runtime system for executing scripts using a network of mobile, wearable, and/or stationary computing devices.

The interaction system can support releasing scripts to users for execution on their devices.

An evaluation of the interaction system revealed that the interaction system significantly reduces development effort in creating and improving cross-device behaviors by providing a framework for focusing on target interactions. By providing support for programming and executing cross-device interactions, the interaction system can simplify use of devices in ad-hoc networks of computing devices, including wearable computing devices, for both software developers creating programs and end users using the devices executing the programs.

An Example User Interface for the Interaction System

Herein is described an interaction system that allows software developers to easily create cross-device wearable behaviors by scripting, or writing software for interaction system services that operate in networks of computing devices, which networks can include mobile and immobile computing devices. As described herein, an interaction system can include a set of abstractions and application programming interfaces (APIs) that are executable by a particular computing device. The set of abstractions and APIs can be used to communicatively couple to one or more other computing devices other than the particular computing device. The interaction system can include software to create, modify, execute, and/or manage one or more scripts written in an interactive scripting language. As described herein, a script includes one or more instructions that can be interpreted and executed by software of the interaction system to perform herein-described interaction-system functions. As one example, when executed by the interaction system and the underlying particular computing device, a script can use the set of abstractions and APIs to perform high-level application logic and provide UI layouts for the particular computing device and/or the other computing devices.

To create, modify, execute, and manage scripts, the interaction system can include a web-based development environment, such as shown in FIG. 1, where software developers can author (i.e., create, execute, and manage) interaction scripts and test the interaction scripts by executing the script in an environment with a set of emulated or real computing devices. The interaction system also provides a runtime system that allows interaction-system scripts to run in a local (ad-hoc) network of mobile, and perhaps immobile, devices and provide interaction system services easily adapt to specific device configurations.

FIG. 1 shows an example user interface 100 for the interaction system, in accordance with an example office. Interaction system can be loaded on a computer device directly associated with the user interface 100 or loaded on a server and accessed via a local network or a wide area network. In operation the interaction system can receive inputs from the user interface 100 and generates outputs using user interface 100. User interface 100 includes menu 102, editor panel 110, log panel 116 and device panels 120, 130, 140. Menu 102 allows the software developer to manage services including selecting a service to act upon (e.g., edit, test, review, etc.), to run the service, to share the service, and to obtain help. Many other menu options are possible as well.

Editor panel 110 can be used to read, write, update, and delete part or all of the software associated with a service. As shown in FIG. 1, at least two software components scripts and layouts can be edited using editor panel 110. Scripts can include software that, when executed, can perform an interaction system service on one or more devices, while a layout can specify UI input and/or output format(s) to be used in performing the service. FIG. 1 shows that editor panel 110 is configured for editing a JavaScript® language script (example photo viewer script partially shown in FIG. 1). Other and/or different software languages than JavaScript® can be used in developing services using user interface 100. Editor panel 110 also includes save button 112 to save a script to a file in permanent storage and run script button 114 to execute the script on a network of device(s) associated with user interface 110.

Log panel 116 can allow a software developer to monitor and operate emulators or live device(s) in the network associated with user interface 100. In particular, log panel 116 at the bottom of user interface 100 can provide more detailed information for debugging and/or testing an interaction system service by outputting information about past events and by displaying script outputs.

In the example shown in FIG. 1, a network of three devices are currently associated with the interaction system and represented on user interface 100—smartphone 122 shown in device panel 120, smartwatch 132 shown in device panel 130, and head mounted display 142 in panel 140. In some embodiments, user interface 100 includes controls to add, change, and/or remove devices from the network associated with interaction system and represented on user interface 100. In other embodiments, user interface 100 includes controls to add, change, and/or remove entire networks of devices as being associated with user interface 100.

Device panel 120 includes information about smartphone 122, such as information that indicates smartphone 122 is "*LIVE*" and is a "Model 123". When a device is indicated in a device panel as live, then the device is actually connected, rather than being emulated, to the interaction system. In the example shown in FIG. 1, smartphone 150 is a live device corresponding to smartphone 122 in device panel 120. For live devices, I/O device components; e.g., touch screens, buttons, speakers, of the live device can be controlled by scripts of the interactive system and tested/executed using user interface 120. For example, if smartphone 150 is rotated, a rotation sensor on smartphone 150 can generate a rotateCW (or rotateCCW) event that can cause display of smartphone 122 to be rotated in device window 120.

Device panel 130 includes information about smartwatch 132, such as information that indicates smartphone 132 is "*LIVE*" and is a "Model 456". In the example shown in FIG. 1, smartwatch 152 is a live device corresponding to smartwatch 132 in device panel 130.

Device panel 140 includes information about HMD 142, such as information that indicates HMD 142 is an emulated "Model 789" HMD. Action buttons 144 can, when selected, perform emulated actions for HMD 142, such as, but not limited to: an up arrow button to simulate a swipe up event, a left arrow button to simulate a swipe down event, a left arrow button to simulate a swipe left event, a right arrow button to simulate a swipe right event, "listenStart" to indicate the HMD is ready to listen, and "call" to simulate making a telephone call. Different devices, such as smartphone 122, smartwatch 132, and HMD 142 can each have different associated actions, while in other examples, different devices; e.g., two different devices of the same type, can have the same associated actions.

Add button 154 can be used to join a new device to the interaction system associated with interaction system 100. In the example shown in FIG. 1, a real smartphone device can be added by taking a picture of a QR code encoding data about the real smartphone, such as indicated in image 156. Other techniques can be used to add devices to the interactive system; e.g., manual data entry of information such as the model number, use of other types of codes (e.g., bar codes), machine-to-machine communication between a computing device, upon which the interaction system associated with user interface 100 is executed, and the device(s) to be added so that the device(s) can provide data similar to that encoded by the example QR code for addition to the interactive system. In other embodiments, a remove device user interface object can be used to remove devices from the interaction system. For example, a remove device button similar to add button 154 and/or a menu activated upon selection of a specific device via device panel 120, 130, or 140, can initiate device removal; then, a remove device option dialog can be used to select or confirm that one or more devices is to be removed.

In some embodiments, more, fewer, and/or different actions can be performed and/or simulated using action buttons, such as action buttons 144. In still other embodiments, action buttons can be used to simulate actions that cannot occur on some real devices; e.g., simulate making a telephone call on a real device without telephone capabilities.

An Example API for a Cross-Device Interaction System

The interaction system can include an API, summarized below in Table 1, that allows software developers, via scripts and/or other programs, to work with the interaction system which is referred to as "weave" herein.

TABLE 1

Device Selection Operators
weave.select(selector)
    Returns a WeaveSelection object that includes all the matched device(s) on a local
    network based on an input selector parameter. selector can include a list of filter
    criteria specified as a string. In some embodiments, spaces, tabs, carriage returns, line
    feeds and other negative space characters in the string can be ignored. In other
    embodiments, criteria listed in the selector parameter can be considered to logically
    combined using Boolean "AND" condition.
    Example usage:
    weave.select('showable[size="normal",joint="hand"],
    touchable')
    The above example selector selects all devices having showable and touchable
    device capabilities, with the showable capability having a "normal" size that is found
    at/near a "hand" joint. Additional device capabilities are described with respect to at
    least Table 2 below.
weave.selectAll( )
    Returns a WeaveSelection object that includes all the device(s) in the local network.
    Example Usage: any of the following performs the selectAll operation of returning a
    WeaveSelection object that includes all device(s) in the local network:
      • weave.selectAll( )
      • weave.select( )
      • weave.select('')
      • weave.select('all')
weave.getDeviceByType(type)
    Returns a WeaveSelection object that includes all the matched device(s) on a local
    network based on an input selector parameter that specifies a device type.
    type values include, but are not limited to: phone for telephonic devices such as smart
    phones, watch for smart watches, and glass for head mountable devices.
    Example usage: weave.getDeviceByType('phone')
    This example returns a WeaveSelection object that includes all telephonic devices on
    the local network.
weave.getDeviceByJoint(joint)
    Returns a WeaveSelection object that includes all the matched device(s) on a local
    network based on an input selector parameter that specifies a portion of a body where
    the device(s) is/are typically worn.
    joint values include, but are not limited to: 'hand' for devices typically carried in
    hand, 'wrist' for devices typically worn on a wrist, and 'head' for devices
    typically worn on a head.
    Example usage: weave.getDeviceByJoint('wrist')
    This example returns a WeaveSelection object that includes all devices on the local
    network typically worn on a wrist (e.g., watches).
weave.getDeviceById(id)
    Returns a WeaveSelection object that includes all the matched device(s) on a local
    network based on an input selector parameter that specifies identifier(s) of devices in
    the network.
    id values include, but are not limited to device names, device addresses (e.g., IP
    addresses, phone numbers), serial numbers, and other identification numbers / strings.
    Example usage: weave.getDeviceById('5551212')
    This example returns a WeaveSelection object that includes all devices on the local
    network associated with the identifier '5551212' (e.g., a phone number).
Event Handler Operator
An event handler operator can be used to specify functions for processing or handling of events
that occur within the interaction system.
event.on(eventType, handler)
    The .on operator enables triggering of a handler callback function when an event of
    type eventType occurs on a specified device. The callback function takes one
    parameter-event -that includes information about the eventType event. Example
    eventTypes are shown in Table 2 below as "Associated Event(s)".
    Information about the event can be obtained using event methods, such as:
      • event.getDevice( ) or event.getDevices( ) which return WeaveSelection objects
        specifying source device(s) that triggered the event; and TABLE 1-continued • event.getValue( ) which returns a value corresponding to the event, such as a
button value for a buttonPress event, or a location value for a
newLocation event.
Other event methods are possible as well.
Example usage: see lines 0008-0012 and 0019-0025 of Table 3 below.
event.off(eventType)
    The .off operator disables triggering of a previously specified callback function for
processing an event of type eventType.
User Interface (UI) Layout Operator
A UI Layout Operator can perform one or more UI operations.
weave.getLayoutById(panelID)
    The .getLayoutById operation can return a Panel object specifying part or all of a
layout. The part or all of a layout can be identified using panel identifier parameter
panelID. The layout can be defined using HTML or other markup language content.
    Example Usage:
    The returned part or all of the layout can then be displayed using a device action operator;
e.g., the .show operator as indicated below:
    weave.select('showable').show(weave.getLayoutById('panel'))
Other UI operations / UI Layout Operations are possible as well.
Device Action Operators
A device action operator can be used to carry out actions within the interaction system.
weave.show(Panel)
    Render a UI panel on the device.
    Example usage: The following operation can display a layout named 'panel' on a
screen or other display of the device:
    weave.select('showable').show(weave.getLayoutById('panel'))
weave.show(String)
    Render a string object on the device.
    Example usage: The following operation can display a string 'Hello World.' on a screen
or other display of the device:
    weave.select('showable').show('Hello World.');
weave.play(filepath)
    Play a media file stored according to the filepath on the device.
    Example usage: The following operation can play the audio/ring.mp3 file on the
device:
    weave.select('speakable').play('audio/ring.mp3');
weave.call(num)
    Make a telephone call to a specified number num.
    Example usage: The following operation can cause a device with a phoneable
capability to make a telephone call to phone number 6501234567:
    weave.select('phoneable').call('6501234567');
weave.startApp(appname)
    Launches a device application specified by appname.
    Example usage: The following operation can launch a 'Maps' application on a device
with a showable capability:
    weave.select('showable').startApp('Maps');
Additional example device action operators are possible as well; e.g., to perform the actions
indicated as "Associated Action(s)" in Table 2 below.
Device Manipulation Operators
By default, Weave sees each device equally and picks one suitable device for a specified action.
An event handler or an action can be attached to each individual device.
The following methods provide other device behaviors:
weave.all( )
    Return a WeaveSelection object that each device will behave the same; that is, an action
provided to the returned object will be applied to all devices referred to by the returned
object (e.g., .show the same content on all displays).
    Example usage: The following operation can display the string 'All on!' on all
devices that have a 'showable' capability:
    weave.select('showable').all( ).show('All on!');
    An event handler specified for the returned object will be triggered only when the event
occurs on all the devices (e.g., all devices .shake at the same time).
weave.combine( )
    Return a WeaveSelection object that encapsulates the devices as one conceptual device:
    An action will be distributed to devices. For example, content to be shown using the
.show operator can be distributed to .show on individual screens.
    Developers can specify a new event condition using the same format of device selection.
    An event handler will be triggered only when the event occurs on the specified devices.
    Example usage: the following code segment can return a combinedDevice object
encapsulating all devices in a local network as one conceptual device. Then, a user
interface panel 'panel1' is displayed on all devices making up the conceptual device,
and an event handler is specified to accept a pinch event over two devices within the
conceptual device.
    var combinedDevice = weave.selectAll( ).combine( );
    combinedDevice.show(weave.getLayoutById('panel1'));
        combinedDevice.on('swipeDown[joint="hand"],
    swipeUp[joint="watch"]', TABLE 1-continued

```
            function(event) {
                // pinch over two device code
            });
weave.not(...)
    This operator enables exclusion of devices based on one or more criteria, which can be
    provided via a selector string, a WeaveSelection object, and/or a specific device object.
    Example Usage:
    The following example can exclude some or all devices from a group G one or more
    devices already selected as having a showable capability:
            weave.select('showable').not('phoneable')
            The above example excludes devices having a phoneable capability from
            group G
            weave.select('showable')
                .not(weave.getDeviceByType('glass'))
            The above example excludes devices that are of type glass from group G
Weave Classes / Objects
WeaveSelection class / object
    This object can include a list of devices, behaviors (devices to behave individually, all as
    a group, or combined), and methods (to apply to the devices based on the behavior). A
    WeaveSelection object can be chainable to run multiple methods in sequence.
    Example Methods:
    .size( )
    Returns the number of devices in the WeaveSelection object.
    .getDeviceName( ), .getDeviceNames( )
    Returns the device name(s) for device(s) in the WeaveSelection object.
    .getDeviceHasUIById(id)
    Returns device(s) that is showing an UI element with the specified id.
    .updateUIAttr(elementID, attribute, value1)
    Replace a previous value of attribute for specified elementID with value1.
    The following example replaces a src attribute of an ImageView element with a value
    of the filepath 'img/new_image.png':
    weave.select('showable').show(weave.getLayoutById('panel'))
            .updateUIAttr('imageView','src', 'img/new_image.png');
Device class / object
    This class/object can manage one device.
    Example Methods:
    .is(selector)
    Returns true if the device has the capability indicated by selector. The following
    example returns true if the device represented by the phoneableDevice has the
    phoneable capability, and returns false otherwise:
            phoneableDevice.is('phoneable')
    .size( )
    Returns the number of devices represented by the object; i.e., always returns 1.
    .getDeviceName( )
    Returns the name of the device.
    .updateUIAttr(elementID, attribute, value)
    Replace a previous value of an attribute of the specified elementID. Element with
    value.
Log class / object
    Show log messages in a log panel and/or adds a message to a log file
    Example Methods:
    Log.display(p1); - sets a destination log panel as UI panel p1
    Log.file(f1); - sets a destination log file as file f1
    Log.log(m1); - adds message m1 to the log file / log panel
    Log.log(m1,c1); - adds message m1 to the log file / log panel using color c1
```

Table 2 below shows examples for use with the above-mentioned API of: I/O components of devices, keywords used to select devices having a specified I/O device component, further specification of the specified I/O device component, and example actions and events associated with the specified I/O component.

TABLE 2

| I/O Device Component | Selector Keyword/ Device Capability | Further Specification(s) | Associated Action(s) | Associated Event(s) |
|---|---|---|---|---|
| Display/LED | showable | size [xlarge, large, normal, small] glanceability [high, normal, low] privacy [high, normal, low] interruption [high, normal, low] | .show .play | n/a |
| Speaker | speakable | privacy [high, normal, low] | .play | listenStart, listenEnd |
| Microphone | talkable | n/a | .record | talkStart, talkEnd |
| Touch Pad/ Screen | touchable | size [xlarge, large, normal, small] | n/a | buttonPress, tap, doubletap, longtap, swipe, |

TABLE 2-continued

| I/O Device Component | Selector Keyword/ Device Capability | Further Specification(s) | Associated Action(s) | Associated Event(s) |
|---|---|---|---|---|
| Accelerometer | shakeable | dimension [X, Y, Z] | n/a | touchStart, touchMove, touchEnd shake, move |
| Rotation Sensor | rotatable | n/a | n/a | rotateCW, rotateCCW |
| Telephone | phoneable | number [phone number], max_connections [1, 2, 3, . . .], do_not_disturb [Y/N], textable [Y/N] | .call .answer .text | answerCall endCall joinCall |
| Networking Interface | connectable | MAC_address [address], IP_address [address], id [id], authentication [passwd, biometric, token, key] | .conn .disconn | connReq disconnReq |
| Camera | camerable | n/a | .image .movie | imageTaken, movieStart, movieEnd |
| Location Device (e.g., GPS sensor) | locatable | n/a | .conn .disconn | newLocation |
| Step Tracker | stepTrackable | n/a | n/a | stepTaken |

Table 1 indicates that the API for Weave allows for device selection within the interaction system using a select( ) operator. In some examples as shown above in Table 1, the select( ) operator can take a selector string as an input parameter. The selector string can list one or more selection criteria for choosing active devices networked in the interaction system. In some embodiments, spaces, tabs, carriage returns, line feeds and other negative space characters are ignored. In other embodiments, all items listed in the selector string can be considered to be logically AND'd; for example, a weave.select('showable, touchable') would select all devices have both showable and touchable interfaces. In other embodiments, selection criteria can be specified using more, less, and/or different data than the selector string.

The API can associate the select( ) device selection operator with a number of operators and actions:

Select all devices networked with the interaction system using a selectAll( ) operator. In some embodiments, some or all of the following statements are equivalent: selectAll( ), select( ), select (' '), and select ('all').

Select all devices having a specific type using the getDeviceByType (type) operator. Example types include a phone type for devices having telephony capabilities, a watch type for devices that have a wristwatch-style form factor, and an HMD type for head-mountable devices. Many other device types; e.g., laptop, TV, appliance, camera, server are possible as well.

Allow body-centric selection of devices using the getDeviceByJoint (joint) operator. Examples of body-centric selection include selection of devices using criteria for joints that include a hand joint for devices typically worn on or near a user's hand, wrist joint for devices typically worn on or near a user's wrist, and eye joint for devices typically worn on or near a user's eye.

Many other joints are possible as well; e.g., arm, neck, elbow, leg, knee, foot. In some cases, body-centric criteria can specify, perhaps as a joint, an object typically worn or carried by a user; e.g., pocket, purse, keyring, billfold.

Exclude other devices from selection using a .not action; e.g., weave.select(<selection_criteria>).not(<exclusion_criteria>). In some embodiments, actions for other Boolean operations can be provided as well; e.g., .or, .and, .xor, .nor, .nand.

Specify event handling using an .on action; e.g., weave.select(<selection_criteria>).on(<event_handler info>).

Display information on device(s) using a .show action; e.g., weave.select(<selection_criteria>).show(<display_info>). Examples of display information include, but are not limited to, a panel identifier, a string or other data to be displayed, and/or a file with data to be displayed.

Process digital media (media files, streams, etc.) on device(s) using a .play action; e.g., weave.select(<selection_criteria>).play(<media_info>). Examples of display information include, but are not limited to, a panel identifier, a file with media to be processed, and a reference to one or more streams of media to be processed.

Originate a telephone call on device(s) using a .call action; e.g., weave.select(<selection_criteria>).call (<telephone_info>).

Answer (terminate) a telephone call on device(s) using an .answer action; e.g., weave.select(<selection_criteria>).answer(<telephone_info>).

Originate a text message on device(s) using a .text action; e.g., weave.select(<selection_criteria>).text(<telephone_info>).

Launch an application on device(s) using a .startApp action; e.g., weave.select(<selection_criteria>).startApp(<app_info>).

Connect devices using a .conn action; e.g., weave.select (<selection_criteria>).conn (<network_info>). Once a connection is established, connected devices can transfer data directly using the established connection.

Disconnect devices using a .disconn action; e.g., weave.select (<selection_criteria>).disconn (<network_info>).

The API allows access to a panel, or viewable portion, of the user interface of a selected device using the getLayoutById( ) operator. In some embodiments, the API allows access to a showable device using the getShowable( ) operator and/or access to pixels of the showable device using the setShowable (<pixel data>) operator. Examples of pixel data include but are not limited to, one or more sets of [X, Y, R, G, B] values, with [X, Y] specifying a pixel on a showable device, and with [R, G, B] specifying red, green, and blue color values for the pixel, other sets of values for setting pixel values, and/or a path to an image file to be displayed. Many other examples for accessing and modifying showable devices are possible as well.

The API permits selection of a mode for multi-device selection. As discussed above in the context of Table 1 and below in the context of FIG. 3, the interaction system has three modes for communicating with devices: a default mode where each device is addressed individually, a concurrent mode where all devices are treated equally, and a distributed mode where combinations of devices can be formed.

To enter into the concurrent mode, an .all action can be used to return a WeaveSelection object (concurrent mode discussed in detail below). As mentioned above, in the concurrent mode, all devices are treated equally and so each selected device will behave the same. For example, each action will be applied to all the devices (e.g., a .show action in concurrent mode will cause the same content to be displayed on all selected displays). One example to use the .all action to show the words "all on" on all active devices having a display is: weave.select ('showable').all( ).show ('all on').

In the concurrent mode, an event handler is triggered only when a corresponding event occurs on all the devices at or near the same time (e.g., all devices register .shake events at or near the same time). In some embodiments, the events must occur within some threshold amount of time (e.g., 500 milliseconds, 1 second) to be considered as occurring at the same time.

To enter into the distributed mode, a .combine action can be used to return a WeaveSelection object (distributed mode discussed in detail below). As mentioned above, in the distributed mode, combinations of devices can be formed, and the returned WeaveSelection object from the .combine action call can encapsulate a combination of selected devices as one conceptual device: In the concurrent mode, actions will be distributed to the combination of devices. For example, the following portion of an interaction system script can select devices whose displays are at least "normal" sized, represent that combination of devices in a variable for WeaveSelection object called combinedDevice, and to distribute content to be shown each individual panels of displays for devices in

```
combinedDevice:
    var combinedDevice =
        weave.select('showable[size>="normal"]').combine( );
    combinedDevice.show(weave.getLayoutById('panel'));
```

In the concurrent mode, developers can specify a new event condition using the same format of device selection. An event handler will be triggered only when the event occurs on the specified devices of the combination of devices. For example, the following portion of an interaction system script can be used to select all devices as a combination of devices, represent that combination of devices in a variable for WeaveSelection object called combinedDevice, and to call a callback function (not specified in the example) when the combinedDevice registers a swipeDown event from a device located at or near a hand of the user and a swipeUp event from a device located at or near a wrist of the user at the same time. In some embodiments, these events must occur within some threshold amount of time (e.g., 500 milliseconds, 1 second) to be considered as occurring at the same time.

```
var combinedDevice = weave.selectAll( ).combine( );
combinedDevice.on('swipeDown[joint="hand"],
        swipeUp[joint="wrist"]',
        function(event) {
            // add callback function for
            // handing pinch over two devices
    });
```

Many other types of devices, joints, operators and actions are possible as well using the API.

Several classes are associated with the API, including a WeaveSelection object, a Device object, and a Log object. In some embodiments, more, fewer, and/or different classes can be associated with the API.

The WeaveSelection object can include a list of devices, behaviors, modes (e.g., default mode, concurrent mode, distributed mode), and methods for the devices. The WeaveSelection object can be chainable to run multiple methods in sequence.

Example methods of the WeaveSelection object include, but are not limited to:

a .size( ) method that can return the number of devices represented by the WeaveSelection object, .getDeviceName( ) and .getDeviceNames( ) methods that can each return one or more device names of devices represented by the WeaveSelection object. For example, the returned names can be represented in a string, with the names separated by commas);

a .getDeviceHasUIById(id) method that can return name(s) of device(s) that have a UI element that is specified as id; and an .updateUIAttr(elementID, attribute, new_value) method that can set the value of a UI attribute, specified as attribute, of a UI element, specified as elementID, to a value specified as new_value. For example, the following interaction system script excerpt selects all showable devices, accesses a panel from each selected device, and updates a src attribute of an ImageView element to be 'img/new_image.png'; i.e., changes an image displayed in each panel to be the image specified in the file img/new_image.png
weave.select('showable')
.show(weave.getLayoutById('panel'))
.updateUIAttr('imageView', 'src', 'img/new_image.png');

The device object can maintain properties, status, and methods of one device associated with the interaction system. Example methods for the device object include, but are not limited to:

an .is (selector) method which can return true if the device is capable of the selector option and false otherwise; e.g., phoneableDevice.is ('phoneable');

an active( ) method which can return true if the device represented by the device object is an active device in a current network of the interaction system, and return false otherwise;

a .size( ) method that returns the number of active devices represented by the device object; with a default value of 1. For example, if a device object represents a collection of N active devices; e.g., a combined device in concurrent mode, size( ) can return N, which is the number of devices in the collection of devices;

a .getDeviceName( ) method that can return the device name e.g., in a string; and an .updateUIAttr(elementID, attribute, new_value) method that can set the value of a UI attribute, specified as attribute, of a UI element, specified as elementID, to a value specified as new_value.

The log object can be used to add messages to be displayed in log panel 116 of user interface 100. In some embodiments, the log object can have method(s) that specify optional types and/or colors of messages. For example, five message type options can be specified: Log.v(message) for verbose messages, Log.d(message) for debug messages, Log.i(message) for info messages, Log.w(message) for warning messages, and Log.e(message) for error messages. In other embodiments, a color and/or type can be specified as part of a Log method call:

Log.add_message(message, 'blue');

Log.add_message(message, 'INFO');

In still other embodiments, method(s) of the log object can be used to search for previously specified log messages.

Tools for Creating Cross-Device Interactions

While cross-device wearable interaction has a great potential, it is extremely challenging to develop these applications due to the complexity in combining multiple heterogeneous devices to form a fluid interaction behavior. To manage this complexity, the interaction system can provide a set of high-level API mechanisms for easily synthesizing events across devices. In addition, the interaction system allows software developers to write scripts based on abstractions of devices regarding how they are related to the body and what affordances they have. Body-centric abstractions can simplify the creation of wearable interaction and allow software developers to focus on their high-level target behaviors. A software developer can use the interaction system to create an interaction system service made up of one or more scripts, each having a set of cross-device wearable interaction behaviors. The interaction system service can run across devices and stitch capabilities and native applications on these devices.

To help illustrate use of the interaction system, assume a programmer, Sam, wants to design and implement a Messenger interaction system service, or Messenger Service for short, that brings an incoming voice message to the user's attention and allows the user to play the message or call back the person who left the message. Depending on what handheld and wearable devices that a user might have access to at runtime, the Messenger Service can choose an appropriate device to execute the task. Specifically, when there is an incoming voice message, the service can notify a user via an easily glanceable device (e.g., a smartwatch or an HMD) and allow the user to either view a transcription of the message on the device, or audibly play the message when the user uses a device (such as an HMD or smartphone) that can be used to listen to the message privately.

To create the Messenger Service using the interaction system, Sam can use user interface 100 as a script authoring environment. In some cases, Sam can initiate user interface 100 by pointing a web browser to an interaction system server (see FIG. 1). User interface 100 allows a software developer to create a new service, edit an existing service, and share a service such that users can discover and install it on their devices. On the left of user interface 100 is editor panel 110 where the software developer can edit interaction system scripts and describe UI layouts. On the right of user interface 100 is a test panel with device panels 120, 130, 140 where the software developer can specify a set of wearable or mobile devices, emulated or real, and test an interaction system service on these devices. Log panel 116 at the bottom of user interface 100 helps software developers to debug their scripts.

To create the Messenger service, Sam can then enter an interaction system script in the Script tab of editor panel 100. In some embodiments, the interaction system can automatically generate an empty service function in the Script tab of editor panel 110 when a new script is started.

Table 3 below shows an example interaction system script that Sam can write for the Messenger Service that displays a notification of a new voice message and allows playback and callout.

TABLE 3

```
0001    weave.launchMethod = weave.launchOption.notification;
0002    function service(notif) {
0003        var notifier = weave.select('showable[interruption="low"]'
0004            + 'touchable, speakable, rotatable');
0005        var ui = weave.getLayoutById('mainPanel');
0006        ui.updateUI('callerName', notif.caller.name);
0007        notifier.show(ui)
0008            .on('tap:button', function(event) {
0009                if (event.getValue( ) === 'playMsg') {
0010                    event.getDevice( ).play(notif.voiceMsg)
0011                        .show(weave.getWidget('mediaPlayer'));
0012                }
0013                else if (event.getValue( ) === 'text') {
0014                    event.getDevice( ).show(startApp('Messenger',
0015                        notif.caller.name));
0016                }
0017        });
0018        weave.select('speakable[privacy="high"], phoneable')
0019            .on('listenStart', function(event) {
0020                var phone = event.getDevice( ).play(notif.voiceMsg),
0021                notifier.show('Shake to replay / rotate to call back')
0022                    .on('shake', function(event) {
0023                        phone.play(notif.voiceMsg); })
0024                    .on('rotate', function(event) {
0025                        phone.call(notif.caller.num); });
0026        });
0027    }
```

Sam can start by describing the name of the service; e.g., Messenger Service, as shown at top left of user interface 100 and how the service is to be launched, e.g., in response to a notification (line 0001 of Table 3) or in response to a manual launch request.

Sam can add several criteria in using the interaction system's select operator (see lines 0003 and 0004 in Table 3) to instruct the Messenger Service to select a device that is less interruptive 'interruption="low"' and is equipped with a touchable I/O component (e.g., a touchscreen or touchpad as indicated in Table 2 above), a speakable I/O component (e.g., a speaker), and a rotatable I/O component (e.g., a rotation sensor). In the example Messenger Service script in Table 3, Sam refers to the selected device using the variable notifier. Each device that can utilize the interaction system can have a device profile that captures its input/output (I/O) resources such that the interaction system can match these selection criteria at runtime.

In the Layout tab of editor panel 110, Sam can instruct the user interface (the variable ui in the interaction system script of Table 3) to show a message on the notifier device, where the message includes a title and two buttons for playback and making a call back as specified in the layout shown in Table 4 below. The script can cause the message sender's name to be updated at runtime when invoking the Messenger Service (see Line 0006 in Table 3). To show the UI on the notifier device, Sam can use the notifier.show(ui) action (see lines 0007 in Table 3). Depending on what device is selected at runtime, the UI will be rendered by the interaction system differently to be consistent with device-specific UI guidelines.

Table 4 below shows an example user interface layout.

TABLE 4

```
1001    <!-- The main control panel -->
1002    <div id="mainPanel">
1003    <p>New voice message received from
1004    <span id="callerName"></span>
1005    </p>
```

TABLE 4-continued

| 1006 | <button value="playMsg">Play</button> |
| 1007 | <button value="text">Text Reply</button> |
| 1008 | </div> |

Lines 1001 to 1008 make up an example user interface layout referred to as mainPanel on both line 1002 of Table 4 and on line 0005 of Table 3. The mainPanel user interface is a configuration for showing a name of a calling (or sending) party associated with a message and two buttons— one button whose value is playMsg (line 1006 of Table 4) for playing the message and another button whose value is text (line 1007 of Table 4) for sending a reply text to the calling party.

To handle button touch events, Sam can set up and use a callback function notifier.on ('tap:button', function (event) { . . . } (Lines 0008-0016 in Table 3). Based on whether the playMsg or text button of the mainPanel user interface is tapped by the user, the service either respectively plays back the message (Lines 0010-0012 in Table 3) or sends a text message to the calling party using the Messenger application for the notifier device (Lines 0013-0015 in Table 3).

To allow the user to playback the message privately, Sam adds another behavior to the service by selecting a phone-able device (e.g., a smartphone) with high privacy (Line 0018 of Table 3) and a callback function to respond to the listenStart event (Lines 0020-0025 in Table 3). listenStart can be a built-in event fired by the interaction system's runtime environment when a listen action is detected based on proximity sensor and accelerometers of a phoneable device.

The callback function will automatically play back the message audibly on the selected device (line 0021) and, while the message is playing, show a prompt (line 0021 of Table 3) regarding two available options: shaking the phone to replay the voice message (lines 0022 and 0023 of Table 3) and rotating the phone to call back the party who left the message (lines 0024 and 0025 of Table 3).

Figure 2:
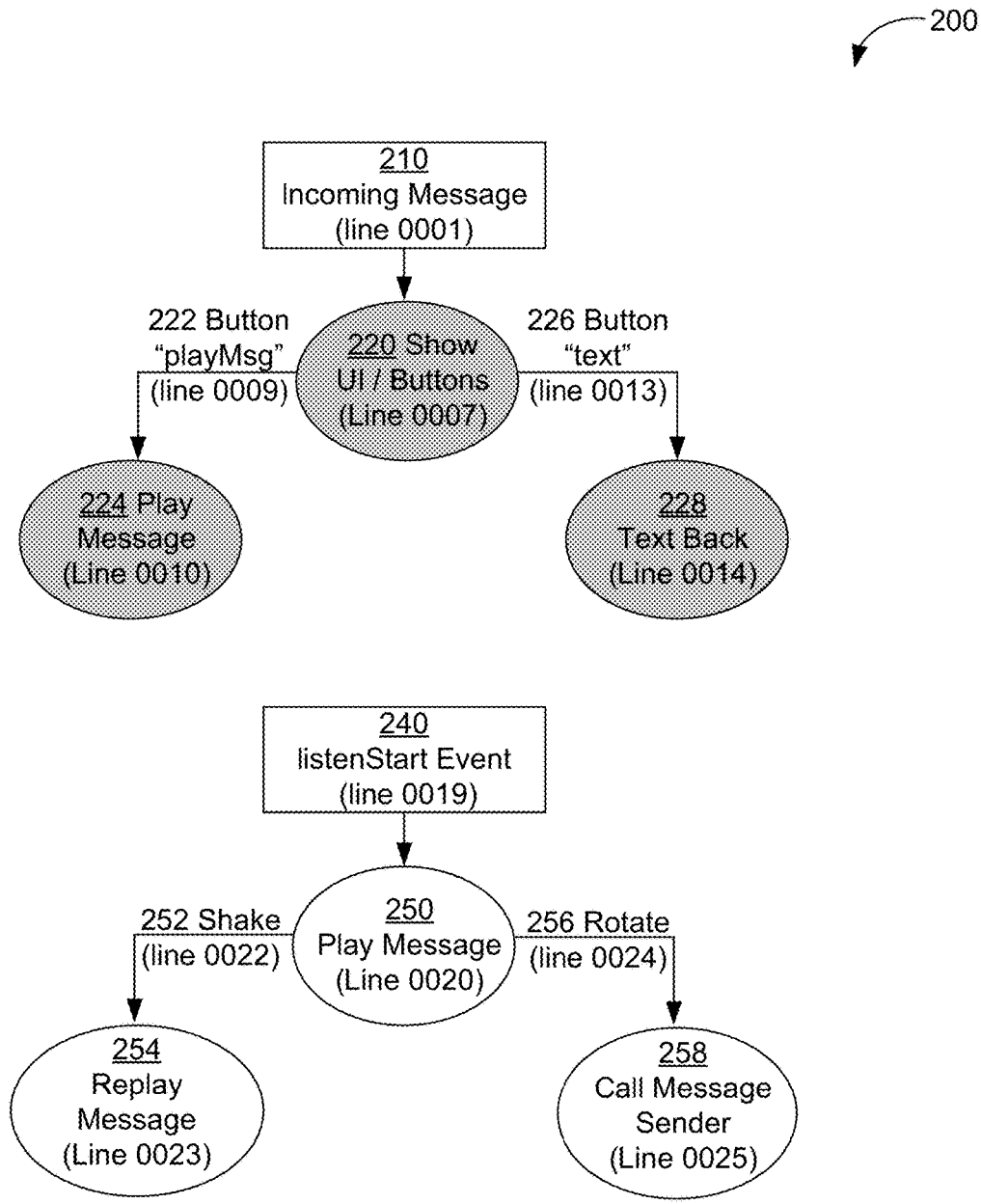
FIG. 2 shows an example interaction flow for an interaction system script, in accordance with an example embodiment.

FIG. 2 shows interaction flow 200 for the Messenger Service, in accordance with an example embodiment. Interaction flow 200 can begin with event 210 of an incoming voice mail message, indicated at line 0001 of Table 3. Event 210 can be processed by a device D1 selected on lines 0003 and 0004 of Table 3; e.g., a smartwatch with a touch interface, a speaker, and one or more motion sensors that detect rotation. Once the interaction system has processed event 210, the interaction system can show 220 a user interface on D1.

The user interface, as specified in Table 4, has two buttons: a playMsg button for playing the voice mail message, and a text button for initiating a text message to the party who left the voice mail message. Interaction flow 200 continues upon occurrence of pressing either of these two buttons. In response to pressing the playMsg button on device D1, the interaction system can generate event 222 as indicated on line 0009 of Table 3, and D1 can responsively play the message 224 as indicated on line 0010 of Table 3. In response to pressing the text button on device D1, the interaction system can generate event 226 as indicated on line 0013 of Table 3, and D1 can responsively initiate sending of a text message 228 as indicated on line 0014 of Table 3.

Interaction flow 200 can continue with detection of listenStart event 240 as indicated at line 0019 of Table 3. Event 240 can be processed by a device D2 selected on line 0018 of Table 3; e.g., a smartphone having high privacy. Once the interaction system has processed event 240, the interaction system can instruct D2 to play 250 the received voice mail message and show a prompt.

Interaction flow 200 can continue with receipt of shake event 252 at device D2, as indicated at line 0022 of Table 3, or with receipt of rotate event 256 from device D2, as indicated at line 0024 of Table 3. In response to event 252, D2 can replay 254 the voice mail message. And in response to event 256, D2 can initiate a phone call 258 to the sender of the voice mail message.

To verify that a service behaves as expected, such as the example Messenger Service, the software developer can test the service on a network of emulated and/or real devices using the interaction system. The interaction system's authoring environment provides a set of preconfigured emulators to allow software developers to test a service with minimal effort. Each emulator allows a set of built-in events, such as swipe, listenStart, and shake to be generated for an emulated device. The built-in events can be triggered via a user-interface; e.g., using action buttons 144 for an emulated HMD controlled via device panel 140 of user interface 100 as shown in FIG. 1. During testing, the software developer can tap on each of these buttons to trigger corresponding events. Software developers can also create new emulators for the interaction system that characterize one or more specific target devices.

Each of the computing devices in a network includes a processor and a transmitter, receiver, or a transceiver. The computing devices can include other components, such as cameras, displays, touch screens, keys, and the like. The interaction system is executed on one or more of the devices in the network. The interaction system is coupled to the user interface 100 and to one or more transceivers which allows the interaction system to be in communication with other computing devices.

To add a real computing device to a network for testing, a software developer can scan a QR code, such as QR code 146 shown as part of device panel 140 in user interface 100 of FIG. 1, using the device to be added; e.g., take a photo of a QR code as shown in image 156. This QR code contains data used by the computing device to be added. Then, the interaction system can connect to and set up the added computing device to interact with the interaction system. After scanning the QR code, a representation of the added registered device can be shown by user interface 100 using a device panel of the test panel. In one example shown in FIG. 1, after QR code 146 is scanned and HMD 164 is added to the network as a registered device representing the previously-emulated HMD 142 of device panel 140. Other methods for adding a computing device are envisioned, such as pairing the to be added computing device to the interaction system computing device, or having the computing device send a message via a wireless link to the interaction system computing device requesting addition to the network of devices in communication with the interaction system.

In some cases, the device panel for the registered device can be marked with a status of the registered device; e.g., "Live", "Disconnected", "Powered Off", etc. With actual devices, the software developer can physically perform actions such as shaking the device or clicking on buttons. Any change on a device's UI can be synchronized with a device window's representation of the device in the test panel of user interface 100. Synchronizing device user interfaces with device panels can allow a software developer to see what is being displayed on computing devices communicating with the interaction system, to monitor the output of multiple devices at a single place in real time, and to facilitate testing of actual devices in locations remote from a location of user interface 100.

In some embodiments, a device can be pre-configured with information about I/O device components (e.g., one or more of the I/O device components listed in Table 2). Then, to add the pre-configured device to the network for testing, user interface 100 and/or other component(s) of the interaction system can send a request to the pre-configured device for the information about the I/O device components. In response, the pre-configured device can send the I/O device component information to the interaction system, and the interaction system can use the received I/O device component information to add the pre-configured device to the network. In other embodiments, the pre-configured device can provide the I/O device information to the interaction system by itself i.e., as part of a request by the pre-configured device to join the network, rather than the interaction system requesting the I/O device information.

Design of the Interaction System

The interaction system includes a set of high-level abstractions for software developers to easily program rich and complex cross-device wearable interactions. A common pattern for modern UI development follows an object-oriented event-driven paradigm, which software developers attach event handlers to a UI object (or a widget) that update the object accordingly when an event occurs. Providing function calls based on high-level abstractions allow software developers to focus on target behaviors rather than low-level operations, such as device specifications and network connections. The interaction system's scripting system was designed to address the unique challenges raised by programming cross-device wearable interaction.

A challenge facing software developers of multi-device services, such as the example Messenger Service discussed above, is to cover networks with different types of devices and combinations thereof that might occur at runtime. For example, some networks can include a smartwatch paired with a smartphone, while others may have an HMD along with a smartphone. Therefore, in addition to directly retrieving devices of a specific type, the interaction system can enable flexible selection of devices based on their high-level input and output capabilities so that a cross-device service can adapt to various specific sets of devices that a user carries. For examples, software developers may choose to stream a message to a glanceable display and add a touch event callback. At runtime, the device could be a smartwatch or HMD depending on what devices are in the network at run time.

Using the interaction system, a software developer selects target devices using a select operation with the following format: weave.select ('CAPABILITY [ATTRIBUTE="VALUE"], . . . '). In response, the interaction system can return a WeaveSelection object that includes one or more qualified and selected devices. The following example select operation for the interaction system selects devices at runtime that have a small, glanceable display that detects rotation; e.g., a smartwatch:

weave.select        ('showable[glanceability="high", size="small"], rotatable').

To select devices that can make phone calls, afford high privacy and have a touch-sensitive display; e.g., a smartphone and/or an HMD, the following example select operation for the interaction system can be used:

weave.select('phoneable[privacy="high"], touchable').

In addition, the interaction system allows software developers to easily select all available devices using the weave.selectAll( ) operation. Software developers can also use interaction system operations to select devices: (a) having a specific type, e.g., getDeviceByType('phone') to select phone devices; (b) (typically) worn at (or near) specific body locations, e.g., getDeviceByJoint('hand') to select devices typically worn at or near a hand joint; and/or (c) by device ID, e.g., getDeviceById('Phone1') to select a phone whose ID is Phone1. Other device selection criteria and/or selection operations are possible as well. Further, software developers can select devices by negating criteria, e.g., to find devices with a display but without a callout function, software developers can use the following select operation: weave.select('showable').not('phoneable').

To find and select desired devices, the interaction system tries to match these high-level criteria against devices that are available at runtime. As mentioned earlier, each interaction system-compliant device can install the interaction system's runtime system, which maintains a profile about the I/O capabilities of the device. Examples of these I/O capabilities include, but are not limited to: device-related information (size, wearable location, privacy of device), information about I/O components of the device (e.g., availability and size of touch-sensitive devices; presence, privacy, size, and/or resolution of displays, availability of text entry devices, such as keyboards), and information about sensors of the device (e.g., accelerometers, locator sensors, rotation sensors). Analogous to UI objects in traditional UI systems, each device in the interaction system can be treated as a UI object in the context of a cross-device UI.

After selecting a device, software developers can apply actions to the device to provide output feedback. To show visual content, the interaction system action device.show (message) can display a message string as text on the device. The interaction system action device.show(weave.getLayoutById(layoutId)) can display a UI layout using editor panel 110 of user interface 100. In the example operation, the UI layout is specified using the layoutId variable. In some embodiments, UI layouts can be specified using HTML or another markup language; e.g., as HTML5 elements.

To realize a single UI layout on multiple devices potentially having different form factors and interaction styles, the interaction system can account for design guidelines of specific devices. For example, a smartphone can have a larger screen than a smartwatch, allowing the smartphone to show relatively more information at one time than the smartwatch.

The interaction system can rearrange components of UI layouts to suit different devices. An example UI layout shown on a smartphone can have four UI components: one line of text (e.g., text such as "Launch Options") and three buttons (e.g., buttons such as "Maps", "Email", and "Talk"). On smartphone 210, the four UI components can be simultaneously displayed with the line of text above the set of three buttons vertically distributed on the display for selection via buttons and/or a touch-sensitive device. On a smartwatch, these four UI components can be displayed using a grid display. Further, on an HMD, the four UI components can be represented as cards. In some embodiments, users can use a touchpad or other interface device of the HMD to perform swipe actions to move forward and backward through the cards. Other representations of UI components and UI layouts are possible as well.

The interaction system allows software developers to modify part of the UI shown on a specific device referred to by a corresponding specific device identifier using the following operation:

device.updateUI(id, new_content).

In this example device.updateUI operation, id is the device identifier identifying a device, and new_content represents content to be displayed on the UI for the identified device. In particular, the device.updateUI operation can provide incremental feedback. In another example, a developer can update one or more specified UI attributes, which are useful for providing incremental feedback. In the following example, the UI attribute "attr" is updated with a new value new_attr:

device.updateUIAttr(id, attr, new_attr).

To fully leverage the capability and existing applications of each device, the interaction system allows a service to invoke native applications on the device from the script, using the following example interaction system action: device.startApp(app_name). An interaction system service can also make a phone call using example interaction system action device.call(phone_num) and play a media file using example interaction system action device.play(media_file). Other example interaction system actions and/or operations for communicating with other devices as possible as well, such as operations related to text messaging, email, video and/or audio streaming, file/application sharing, and other types of communication.

Attaching Event Callbacks to Devices

Based on what UI elements and sensor events are available on a selected device, software developers can add a callback function to the device to handle user input. Table 5 shows an example interaction system script for a remote controller service that allows selection of a target application on a first device, such as a smartwatch, to launch the target application on a second device, such as a smartphone:

TABLE 5

| | |
|---|---|
| 3001 | weave.select('showable[size="small"], touchable') |
| 3002 | .show(weave.getLayoutById('panel')) |
| 3003 | .on('tap:button', function(event) { |
| 3004 |   weave.select('showable[size="normal"]') |
| 3005 |   .not(event.getDevice( )) |
| 3006 |   .startApp(event.getValue( )); // value is app name |
| 3007 | }); |

In the code shown in Table 5, at line 3001, devices with small displays and touch-sensitive devices are selected. Then, a call back function specified on lines 3003-3006 is associated with a button tap event via the .on ('tap: button' . . . ) operation on line 3003, where the tapped button corresponds to an application.name. When the button is tapped, the interaction system executes the callback function with an. event argument passed in the callback function that stores a corresponding value; e.g., the application name. Then, on line 3004 and 3005, a select operation selects a device with a normal sized display ('showable [size="normal"]') that is not the current device .not(event.getDevice( )); i.e., the device selected at lines 3004 and 3005 is not the same as (remote from) the device selected at line 3001. On line 3006, the interaction system launches an application on the selected remote device using the .startApp operation, where the application name is specified by the corresponding value obtained using the action event.getValue( ).

The interaction system provides other useful built-in events including shake, rotateCW (clockwise rotation), and rotateCCW (counterclockwise rotation) that can be inferred from motion sensors, listenStart and listenEnd if a user brings a device close to his ear, and common touch events such as doubleTap, longPress, and swipe. Note that the interaction system is designed to support device selection chaining and event propagation so that software developers can attach the above operations in sequence, such as displaying items via the UI, adding several event callback functions, and applying other actions. Many other interaction system events, operations, scripts, and callback functions are possible as well.

Coordinating Cross-Device Behaviors

Leveraging the strengths of multiple devices can form rich interaction behaviors. However, coordinating behaviors of multiple devices can be challenging. Programming event callbacks and UI output for a single device is often straightforward, but these tasks on multiple devices can be extremely complex. The interaction system can enable software developers to carry out multi-device tasks. In one example, a software developer can use the interaction system to display an urgent message to all devices in a network at the same time; e.g., to maximally acquire the user's attention. As a single-device task example, a software developer can use the interaction system to determine the current orientation of a smartwatch, which is then used to indicate a mode for a tap event on a smartphone, e.g., detecting a knuckle or a finger tap.

Figure 3:
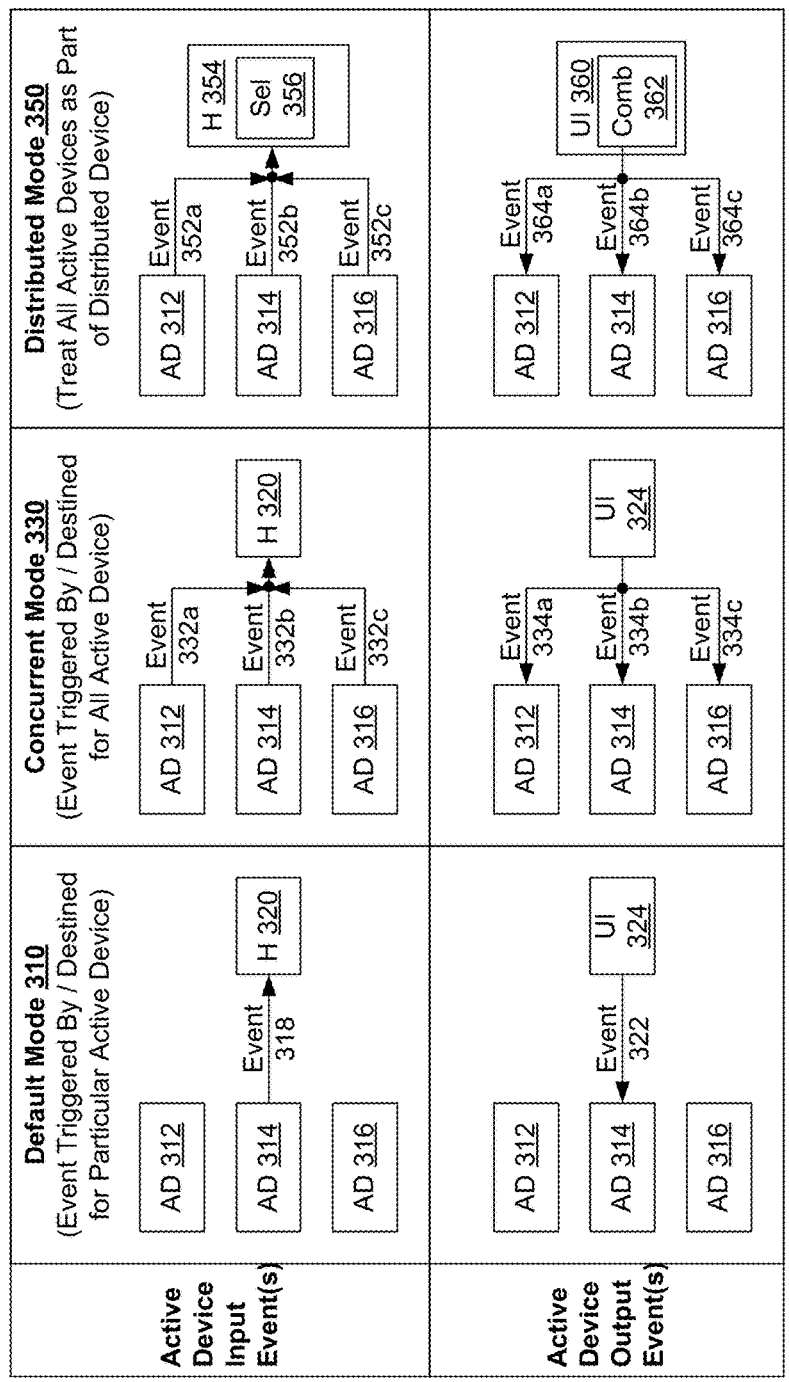
FIG. 3 depicts three modes for an interaction system, in accordance with an example embodiment.

FIG. 3 depicts three device coordination modes, in accordance with an example embodiment: (1) default mode 310, where an event is triggered by any active device, (2) concurrent mode 330 where all selected devices are treated equally, and (3) distributed mode 350, where each active device is treated as a component of a larger machine.

In default mode 310, to execute an action on the selection, the interaction system selects a device in the selection that most closely matches the selection criteria. For example, as shown at upper-left of FIG. 3, one or more of three active devices (ADs) 312, 314, and 316 can fire an event, such as event 318 fired by active device 314, to invokes an event callback function, such as handler (H) 320. For output events when the interaction system is in default mode, user interface 324 can select a closest matching active device to the selection criteria for providing an event. In the example shown at lower-left of FIG. 3, active device 314 is selected by user interface 324 closest match and subsequently user interface 324 provides event 322 to active device 314.

Concurrent mode 330 can be triggered by use of an all operation of the interaction system. By selecting the concurrent mode, multiple devices can be instructed behave simultaneously in the same way. For coordinating device output behaviors during concurrent mode 330, a specific event can occur on all the devices (in the selected set) to invoke a callback function. At upper-center, FIG. 3 illustrates an example use of concurrent mode 330 is that all active devices 312, 314, 316 generate a respective event 332a, 332b, 332c that leads to invocation of handler 320 as a callback function for the respective events 332a, 332b, 332c.

As another example of concurrent mode for inputs, consider an interaction scenario that requires multiple users to physically bump their devices at or near the same time to form a user group. In some embodiments, the interaction scenario can involve a script that collects shake events from each active device and compare timestamps associated with each shake event. To ease the development of this kind of behaviors, the interaction system provides a high-level mechanism, i.e., the .all action, where software developers can specify when and how devices should be synchronized.

Table 6 below shows an example interaction system script for carrying out this interaction scenario.

TABLE 6

```
4001   weave.select('showable, shakable, speakable');
4002        .all({'minNumOfDevices': 2, // at least two devices
4003             'timeRange': 1000 // allow events within a 1 second timeframe
4004        })
4005        .show('Bump to join')
4006        .on('shake', function(event) {
4007             event.getDevices( ).show('Welcome to the group!');
4008                  .play('audio/success.mp3');
4009        });
```

In the example shown in Table 6, each selected device is required to have a display (showable), accelerometers (shakable), and a speaker (speakable) as indicated on line 4001. Continuing the example, a callback function (lines 4006-4009) is defined that is invoked for all devices in concurrent mode specified using an .all action (lines 4002-4004). Then, whenever a shake event (line 4006) co-occurs on the two or more devices within in a time range specified as 1000 milliseconds (line 4004), a welcoming message is shown (line 4007) and a success audio is played (line 4008). In some embodiments, when a time range is not specified, a default time range between events indicating co-occurrence of the events can be used; e.g., 500 milliseconds, 2 seconds.

At lower-center of FIG. 3, an example use of concurrent mode 330 can be user interface 324 broadcasting an event, shown in event 334a, 334b, 334c to all active devices; e.g., respective active devices 312, 314, 316. Then, the broadcast event will be processed by every active device. For example, user interface 324 can broadcast an emergency or other message as event 334a, 334b, 334c to be processed by each selected active device to increase the likelihood that the message is observed.

Distributed mode 350 can be triggered by use of a combine operation of the interaction system. The combine operation can act to join input and output resources of multiple devices so the joined devices can act as a whole while each device performs a different part of a distributed, compound behavior. Using the combine operation, multiple selected active devices can form a single virtual device with more diverse interaction behaviors.

FIG. 3 shows, at upper-right, an example where handler 354 uses selector function 356 to decide how to process events 352a, 352b, 352c received from respective active devices 312, 314, 316 while the interaction system is in distributed mode. For example, data for selector function 356 can be specified using select operations and/or .all actions. Additional data for selector function 356 can be provided by events being generated by devices 312, 314, 316; e.g., some or all of events 352a, 352b, and 352c.

The .combine action also allows software developers to combine different types of input events from multiple devices to create a new interaction style. Table 7 shows an example code fragment for combining inputs from multiple devices.

TABLE 7

```
5001   weave.selectAll( ).combine( )
5002        .on('SwipeLeft[joint="wrist"], swipeRight[type="phone"]',
5003             function(event) {
5004                  event.getDevices( ).show('Pinch gesture detected');
5005        });
```

The code in Table 7 uses a combine operation (line 5001) to process a cross-device pinch gesture and invoke a callback function that prints Pinch gesture detected (callback shown on lines 5003 and 5004). The cross-device pinch gesture is detected on line 5002 when a first device worn on a wrist, such as a smartwatch, detects a left swipe event using SwipeLeft[joint="wrist"] and a phone device detects a right swipe event at the same time using swipeRight [type="phone"].

FIG. 3 shows, at lower-right, an example where user interface 360 uses combination function 362 to decide how to provide events 364a, 364b, 364c received to respective active devices 312, 314, 316 while the interaction system is in distributed mode. For example, data for combination function 362 can be specified using select operations and/or .combine actions. Additional data for combination function 362 can be provided by script operations, actions, and/or callback functions requesting input from and/or output to devices 312, 314, 316.

As an example use of output events for distributed mode 350, consider a cross-device script for holding a slide show. In this application, one device, such as a smartwatch, serves as a control panel for the user to control a list of images that are shown on another device, such as a smartphone. Table 8 shows an example interaction system script for controlling a slide show.

TABLE 8

```
6001   <div id="mainPanel">
6002        <button value="prev">Previous</button>
6003        <button value="next">Next</button>
6004        <img id="imageView" src="img/1.jpg"/>
6005   </div>
6006
6007   var photos = ['img/1.jpg', 'img/2.jpg', 'img/3.jpg'];
6008   var curPhoto = 0;
6009   var combined = weave.select('showable[privacy="low"],
       touchable').combine( );
6010   combined.show(weave.getLayoutById('mainPanel'))
6011        .on('tap:button', function(event) {
6012             if (event.getValue( )=== 'prev' && curPhoto > 0) {
6013                  curPhoto--;
6014             }
6015             else if (event.getValue( )=== 'next'
6016                  && curPhoto < photos.length-1) {
6017                  curPhoto++;
6018             }
6019   combined.updateUIAttr('imageView', 'src', photos[curPhoto]);
6020   });
```

In Table 8, lines 6001 to 6005 show an example user interface layout called mainPanel (line 6001) with two buttons: Previous (line 6002) and Next (line 6003). An interaction system script is specified on lines 6007-6020. In the script, a combine action (line 6009) is used to select and combine all active devices that have a display 'showable [privacy="low"]' and a touch-input device touchable, such as a smartwatch and a smartphone. The interaction system analyzes a target UI that consists of an image viewer interface ImageView (lines 6004, 6019) to show images for the slideshow and the mainPanel interface, which require only a small amount of screen space to display the Previous and Next buttons. Based on this analysis, the interaction system can assign the mainPanel interface to a device with a relatively small display; e.g., a smartwatch, and assign the ImageView interface, which requires higher resolution to be shown, to a device with a relatively large display; e.g., a smartphone. The code on lines 6011-6018 processes button press events to update a curPhoto variable, and line 6019 updates the ImageView interface to display the current photo indexed by curPhoto.

Figure 4:
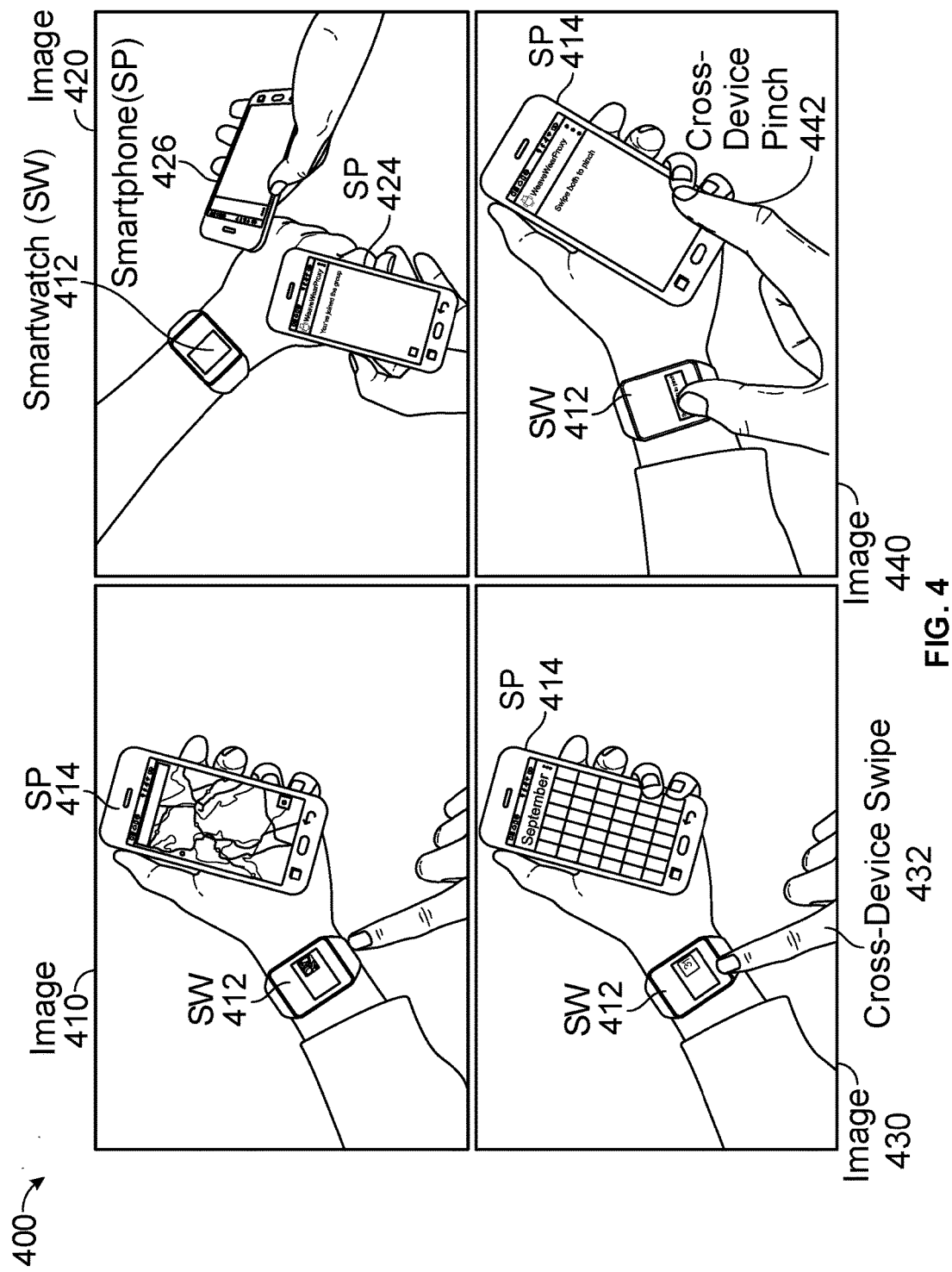
FIG. 4 shows images indicating (a) shake gestures leading to shake events and (b) a cross-device swipe, in accordance with an example embodiment.

FIG. 4 shows scenario 400 associated with images 410, 420, 430, and 440. FIG. 4 includes image 410 shows smartwatch (SW) 412 and smartphone (SP) 414 joined in an interaction system. Image 420 shows shake gestures leading to shake events. Image 430 shows a cross-device swipe between smartwatch 412 and smartphone 414. Image 440 indicates a cross-device pinch between smartwatch 412 and smartphone 414, in accordance with an example embodiment.

Image 420 at upper right shows three wearable computing devices: smartwatch 412 and smartphones 424, 426. In scenario 400, each of smartwatch 412 and smartphones 424, 426 is connected as an active device in a network of the interaction system, and a script including the software shown in Table 6 is being executed utilizing the network of the interaction system. Recall that the script in Table 6 utilizes the .all action to put the interaction system in a concurrent mode.

As indicated in Table 6, each of the devices in the network has to generate a shake event within 1000 milliseconds to join a group. In scenario 400, each of smartwatch 412 and smartphones 424, 426 is shaken within a second as indicated in image 420, and so a group of the interaction system is formed with devices 412, 424, 426. Once the group is formed, a message "Welcome to the group!" is displayed on each device and an audio/success.mp3 audio file is played, as indicated by the interaction system script in Table 6.

Scenario 400 continues with the interaction system operating on the network of smartwatch 412 and smartphone 414 as shown in image 430 at lower-right of FIG. 4. In scenario 400, a script including the software shown in Table 7 is being executed utilizing a network of the interaction system that includes smartwatch 412 and smartphone 414. Recall that the script in Table 7 utilizes the .combine action to put the interaction system in a distributed mode. Image 430 shows a cross-device swipe 432 operation being performed to indicate an information transfer of information from a source device being swiped to a target device—in the example shown in image 430, the source device is smartwatch 412 and the target device is smartphone 414. In some scenarios, the cross-device swipe can include a touch event, bump event, or other event (or events) on the target device (or devices) to indicate a device as a target device (or devices), perhaps within a pre-defined period of time; e.g., if the swipe on the source device and the touch, bump, or other event (events) on the target device (devices) take place within 1000 ms (or some other pre-defined period of time), then the swipe and touch event are to be considered together to be a cross-device swipe from the source device to the target device(s).

Scenario 400 continues with a left swipe being performed on smartwatch 412 and a right swipe being performed on smartphone 414 to perform cross-device pinch gesture 442, as shown in image 440 at lower-right of FIG. 4. In scenario 400, cross-device pinch gesture 442 causes both a swipeLeft event to be generated for smartwatch 412 and a swipeRight event being generated for smartphone 414. Then, as indicated in Table 7, a callback function is called to process the swipeLeft event for smartwatch 412 and the swipeRight event for smartphone 414 by displaying "Pinch gesture detected" on both smartwatch 412 and smartphone 414. After the callback function of Table 7 is completed, scenario 400 can end.

Example Runtime Architecture for the Interaction System

A server-based architecture for managing scripts and user interactions of the interaction system can be designed. For example, a local server can communicate with and monitor proxies running on each individual device on a network of the interaction system. This server-based architecture can provide flexible device configuration in real-time and allow for scaling up of the interaction system. The architecture allows for devices to be added or removed at run-time and can promptly update device selection and status information.

Figure 5A:
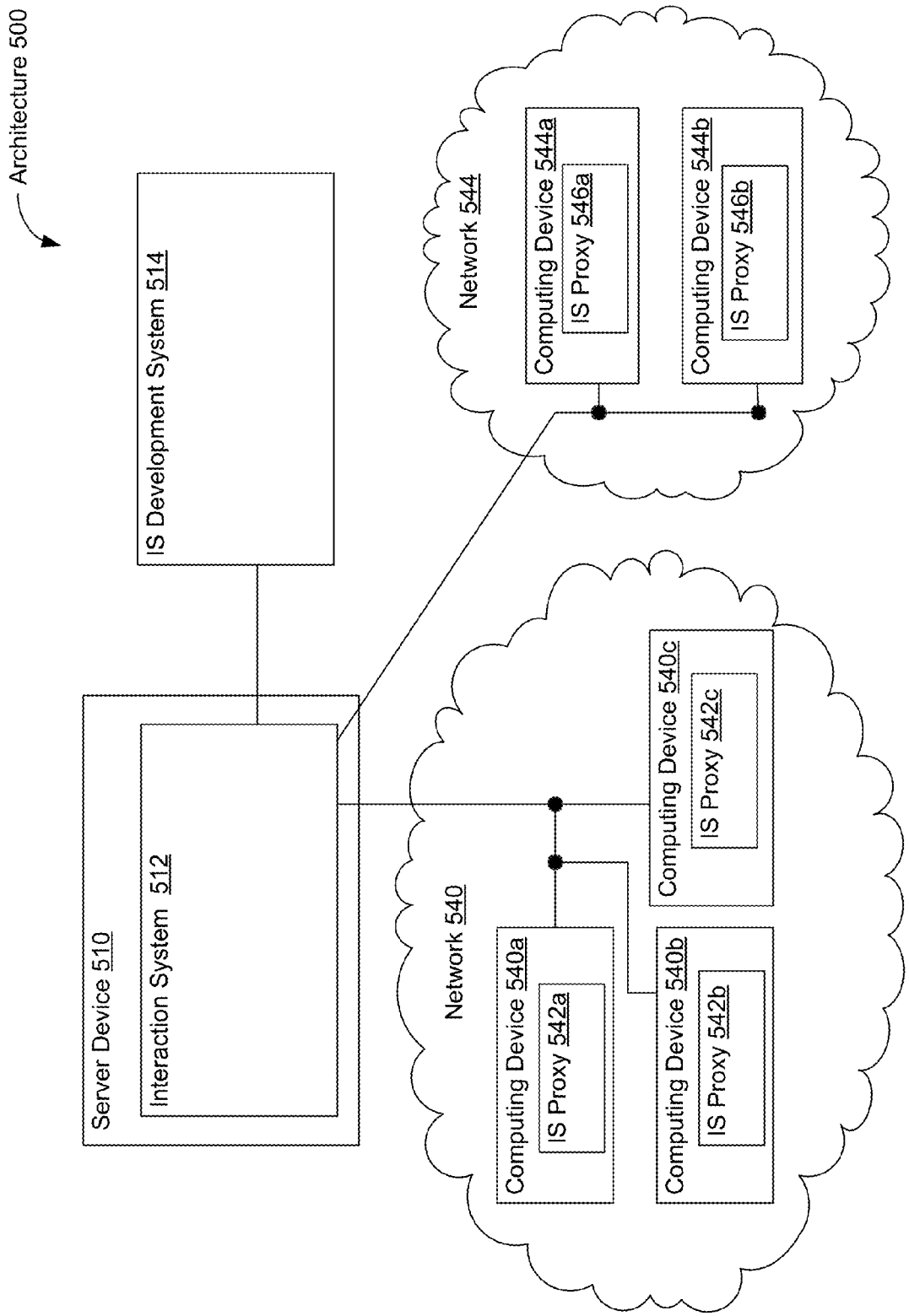
FIG. 5A shows an architecture for creating services for the interaction system, in accordance with an example embodiment.

FIG. 5A shows architecture 500 for creating services for the interaction system (IS), in accordance with an example embodiment. Architecture 500 includes server device 510, interaction system development system 514 and two (ad-hoc) networks 540, 544, with network 540 including computing devices 540a, 540b, 540c and network 544 including computing devices 544a and 544b In architecture 510, server device 510 includes interaction system 512, which can act as an interaction-system engine for interpreting interaction system scripts, managing event callbacks and application states, and establishing communications among devices. Interaction system development system 514 can provides a web development UI for creating, editing, and deleting scripts, layouts, and any other software components for execution on interaction system 512. Server device 510, interaction system 512, and/or interaction system development system 514 can store developers' services including scripts and layouts and control emulators that can simulate computing devices.

On each computing device networked with interaction system 512 of server device 510, a responsive proxy can facilitate communications with interaction system 512 and/ or server device 510 and can out interaction system actions on the device. FIG. 5A shows computing devices 540a, 540b, 540c networked with interaction system 512 of server device 510 as part of network 540, with computing devices 540a, 540b, 540c including respective interaction system proxies 542a, 542b, 542c.

FIG. 5A also shows computing devices 544a, 544b networked with interaction system 512 of server device 510 as part of network 544, with computing devices 544a, 544bc including respective interaction system proxies 546a, 546b. An interaction system proxy can be preinstalled and run on each individual device networked to interaction system 512. The interaction system proxy can provides tools for generating a device profile that describes the capabilities of the device, registering the device with interaction system development system 514 (e.g., by scanning a QR code for developers to test a service on the device as discussed above in the context of FIG. 1), and accessing the server device 510, interaction system 512, and/or interaction system development system 514 for searching and installing a service.

Interaction system proxies 542a, 542b, 542c, 546a, 546b can connect to server device 510, interaction system 512, and interaction system development system 514 via web sockets in a local network (network not shown in FIG. 5A). In some embodiments, some or all of computing devices 540a, 540b, 540c, 544a, and 544b can have limited network capabilities; e.g., a smartwatch can require a paired smartphone for data connection via the smartphone to server device 510, interaction system 512, and/or interaction system development system 514.

In other embodiments, one or more of computing devices 540a, 540b, 540c can host part or all of the functionality of server device 510; e.g., computing device 540 can host interaction system 512. In particular of these embodiments, computing devices 540a, 540b, 540c can form ad-hoc networks and run interaction system scripts without connecting to server device 510 during run-time. In still other embodiments, components of architecture 500 can include more, fewer, and/or different components than shown in FIG. 5A; e.g., interaction system 512, interaction system development system 514.

An interaction system proxy can host a runtime environment for managing an ad-hoc network of wearable devices and for executing interaction system services on devices in the managed ad-hoc network. The interaction system can use a client-server-based runtime architecture within each ad-hoc network. At any time, only one device in a network acts as the server that is responsible for executing the script and distributing the UI feedback and synthesizing events across devices.

Figure 5B:
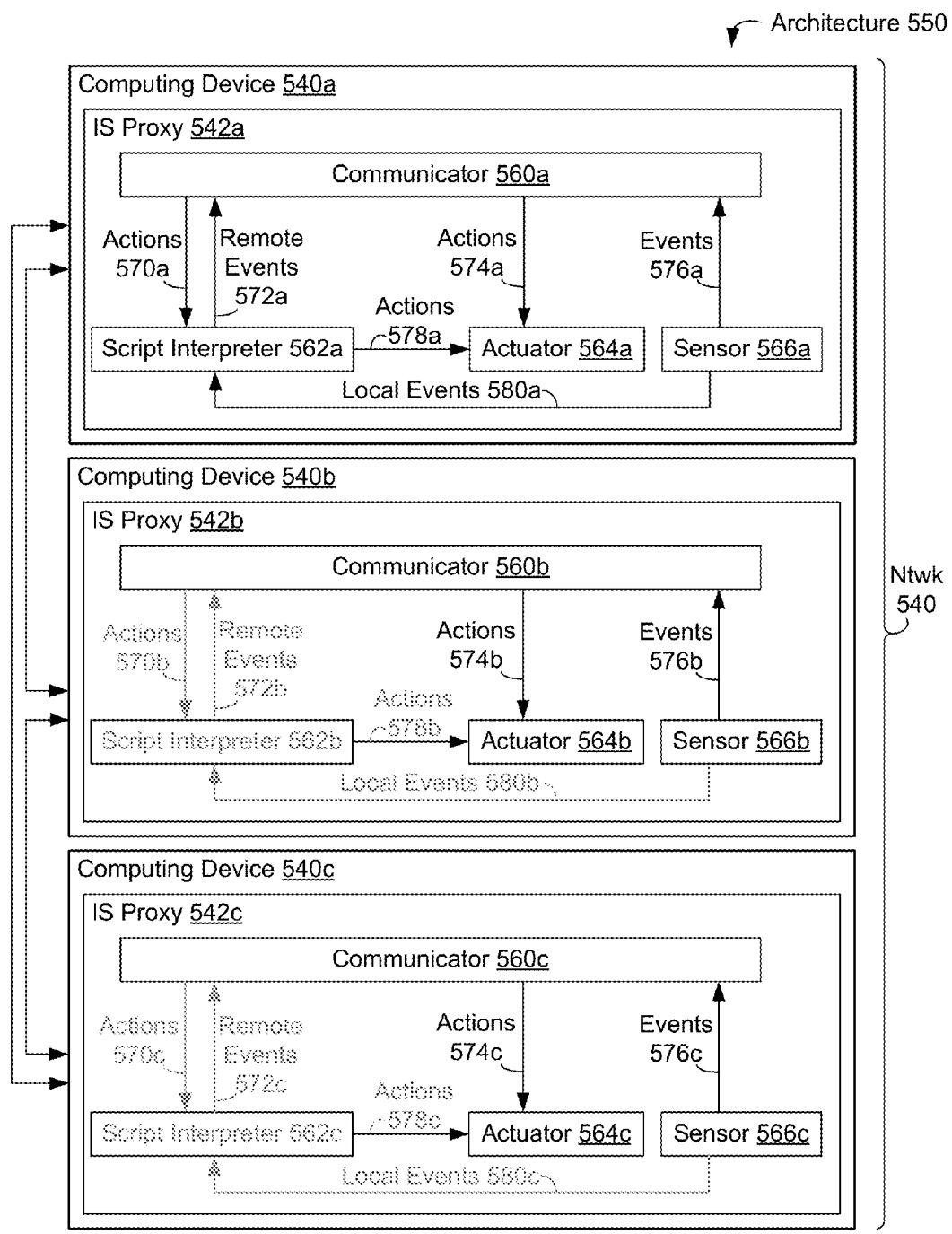
FIG. 5B shows an architecture for a runtime environment of the interaction system, in accordance with an example embodiment.

FIG. 5B shows architecture 550 for a runtime environment of the interaction system, in accordance with an example embodiment. Architecture 550 specifically shows an example runtime environment for network (Ntwk) 540 shown in FIGS. 5A and 5B having communicatively-coupled computing devices 540a, 540b, and 540c with respective interaction system proxies 542a, 542b, 542c.

Taking as computing device 540a as an example, the interaction system runtime environment has four major components. Communicator 560a maintains connections with other computing devices 540b, 540c in network 540, and sends and receives events or actions between devices. Communicator 560a also communicates actions and events internally. For example, FIG. 5B shows that, in computing device 540a, communicator 560a sends actions 570a to script interpreter 562a, sends actions 574a to actuator 564a, receives remote events 572a from script interpreter 562a, and receives events 576a from sensor 566a. In network 540, Communicators 560b, 560c can perform similar tasks for respective computing devices 540b, 540c as communicator 560a can perform for computing device 540a.

Actuator 564a performs actions for updating a user interface of computing device 540a, including providing, visible, audible, and/or tactile (e.g., vibration) feedback in response to interaction system actions; e.g., actions 574a from communicator 560a and actions 578a generated by script interpreter 562a. Actuators 564b, 564c can perform similar tasks for respective computing devices 540b, 540c as actuator 564a can perform for computing device 540a.

Sensor 566a detects user input and sensor events on computing device 540a and sends the events to Script Interpreter 562a as local events 580a and to communicator 560a as events 576a. Sensors 566b, 566b can perform similar tasks for respective computing devices 540b, 540c as sensor 566a can perform for computing device 540a.

In a particular interactive system network, one script interpreter is executing at one time—in the example shown in FIG. 5B, script interpreter 562a is executing, indicating computing device 540a is acting as a runtime server of the interactive system for network 540, and script interpreters 562b, 562c are idle as indicated using grey lettering in FIG. 5B. Script Interpreter 562a can execute scripts, process actions; e.g., actions 570a, 578b, manage event callbacks and interaction states, and provide remote events 572a to communicator 560a for transmission to other devices within network 540.

Devices can be added to or removed from an interactive system network at runtime, and the interactive system can promptly update device selection and status. When a runtime server of the interactive system leaves an interactive system network, another device in the interactive system network can take over as the runtime server for the network, which allows flexible device configuration and stability in executing a cross-device service.

Summary of a Usability Study of the Interaction System

To evaluate the usability of the interaction system, a user study was conducted. A working hypothesis was the participants could use the interaction system to successfully and efficiently create cross-device interactions that included both device inputs and outputs among more than two wearable devices. In the study, participants followed a tutorial to learn the framework, scripted three interactions that used the three interaction system modes (e.g., default mode, concurrent mode, and distributed mode), and tested scripts with both emulators and a set of actual devices. Both quantitative and qualitative results of their scripts and the experience were measured.

To learn the framework, participants were asked to go through a tutorial and code a practice task to script a single-device launch pad. As part of the practice task, participants had the opportunities to learn different device selection criteria, specifying UI layouts in HTML, and adding callback functions to handle button taps. Participants also tested their services with emulators and real devices. API documentation for the interactive system was shown in one display adjacent to another display where participants coded scripts, allowing participants to readily reference the APIs during the study. The practice task took roughly 17 minutes on average.

After completion of the practice task participants were instructed to script three tasks in the following sequence:

Task 1: (Default mode) Modify a single-device Launch Pad created during the practice task to design a cross-device launch pad that runs on a glanceable device with three options (Maps, Email, and Calendar) to launch applications on a hand-held device.

Task 2: (Introducing the .all operator/concurrent mode) Design a bump service that allowed multiple users to join a group by shaking their devices at the same time and to provide both visual and audio feedback when successfully joined.

Task 3: (Introducing the .combine operator/distributed mode) Design a slideshow service that provides a panel on a small-size wearable to browse forward or backward through a list of photos shown on a larger, separate device.

Figure 5C:
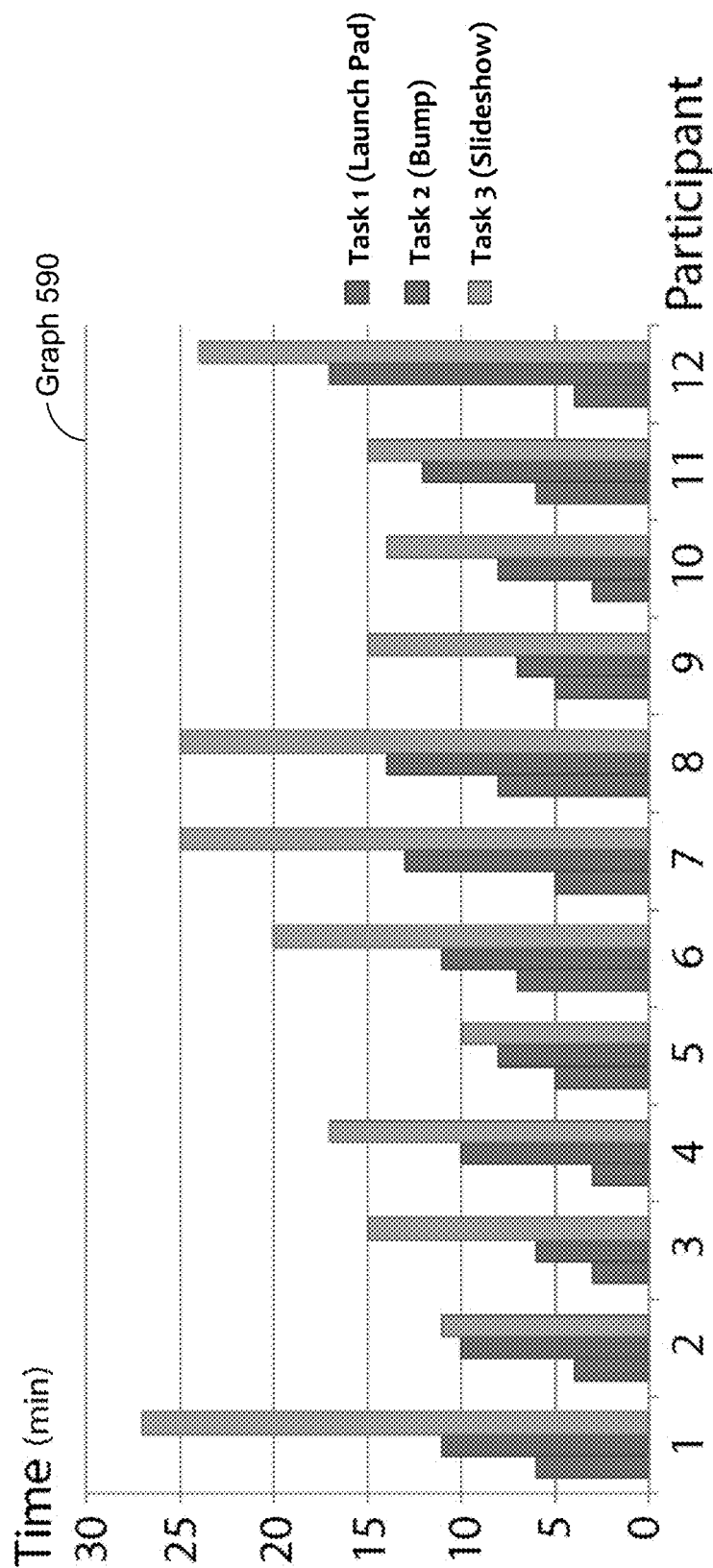
FIG. 5C shows an example graph for task completion times, in accordance with an example embodiment.

FIG. 5C shows graph 590 with task completion times for each participant in the study.

All participants successfully scripted and tested the three tasks during the study. The respective average times for completing each task were 5, 11, and 18 minutes (respective SDs=2, 3, and 6—see also graph 590 of FIG. 5C). The durations of tasks 2 and 3 included time to learn to use the .all and .combine operators. Some participants chose to test the new behaviors before scripting, while others started scripting the tasks after reading the instructions.

In general, participants were impressed by the ease of development using the interaction system. For example, participant 4 (P4) said, "It was fast, easy to learn, and provided a way to unify cross platform devices with the same code. Would have taken a lot more time for me to do any of the tasks individually." Compared to programming with a mobile-device framework from scratch, all the participants suspected that it would have taken them at least three hours to multiple days for a single task, as they would have to work on the environment setup (P1), individual APIs (P8), and details such as message passing (P7).

Example Data Network

Figure 6:
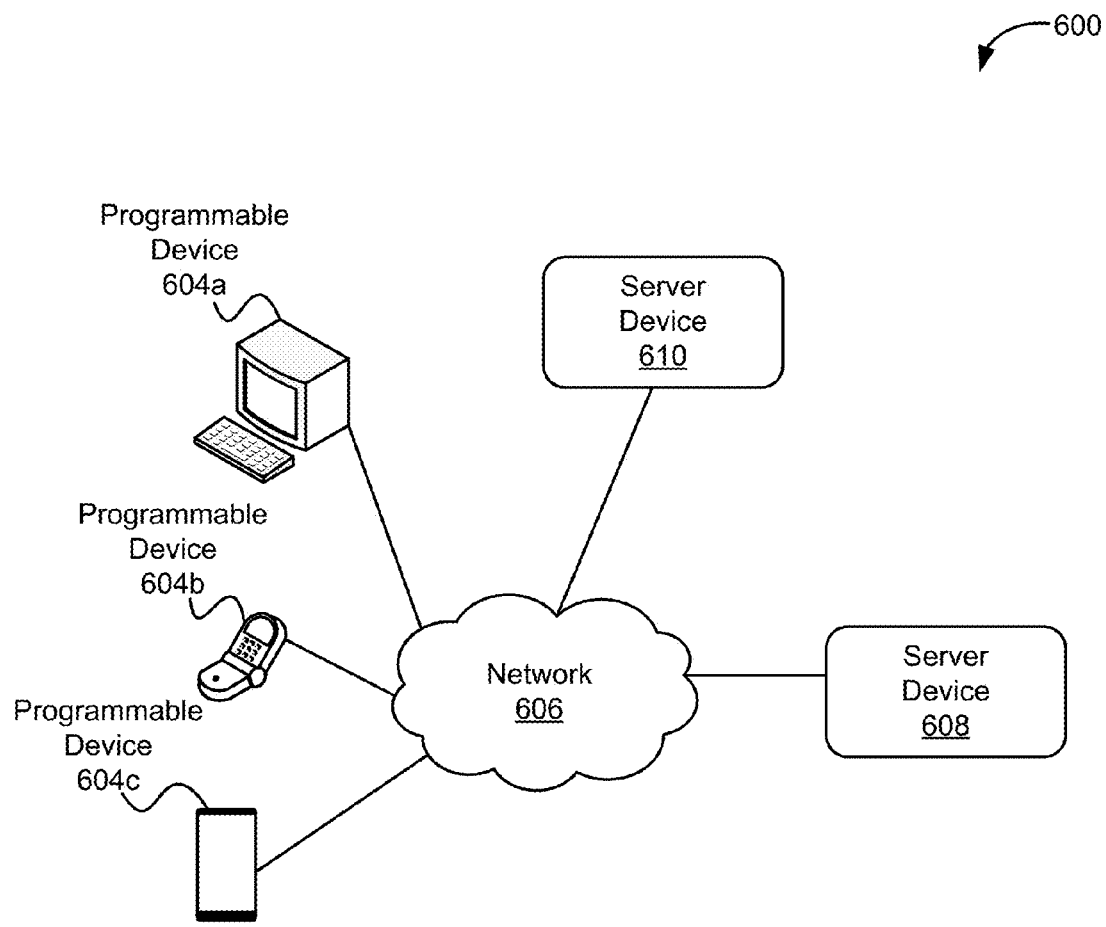
FIG. 6 depicts a distributed computing architecture, in accordance with an example embodiment.

FIG. 6 is a diagram 600 showing server devices 608, 610 configured to communicate, via network 606, with programmable devices 604a, 604b, and 604c. Network 606 may correspond to a LAN, a wide area network (WAN), a corporate intranet, the public Internet, or any other type of network configured to provide a communications path between networked computing devices. The network 606 may also correspond to a combination of one or more LANs, WANs, corporate intranets, and/or the public Internet.

Although FIG. 6 only shows three programmable devices, distributed application architectures may serve tens, hundreds, or thousands of programmable devices. Moreover, programmable devices 604a, 604b, and 604c (or any additional programmable devices) may be any sort of computing device, such as an ordinary laptop computer, desktop computer, network terminal, wireless communication device (e.g., a cell phone or smartphone), and so on. In some embodiments, programmable devices 604a, 604b, and 604c may be dedicated to the design and use of software applications. In other embodiments, programmable devices 604a, 604b, and 604c may be general purpose computers that are configured to perform a number of tasks and need not be dedicated to software development tools.

Server devices 608, 610 can be configured to perform one or more services, as requested by programmable devices 604a, 604b, and/or 604c. For example, server device 608 and/or 610 can provide content to programmable devices 604a-604c. The content can include, but is not limited to, web pages, hypertext, scripts, binary data such as compiled software, images, audio, and/or video.

The content can include compressed and/or uncompressed content. The content can be encrypted and/or unencrypted. Other types of content are possible as well.

As one example, server device 608 and/or 610 can provide programmable devices 604a-604c with access to software for database, search, computation, graphical, audio, video, World Wide Web/Internet utilization, and/or other functions. Many other examples of server devices are possible as well. As another example, the herein-described interaction system can execute on one or more computing devices; e.g., one or more computing devices acting as part or all of programmable devices 604a, 604b, 604c, and/or server devices 608, 610; and utilize network 606 to communicatively couple some or all of the one or more computing devices.

Computing Device Architecture

Figure 7A:
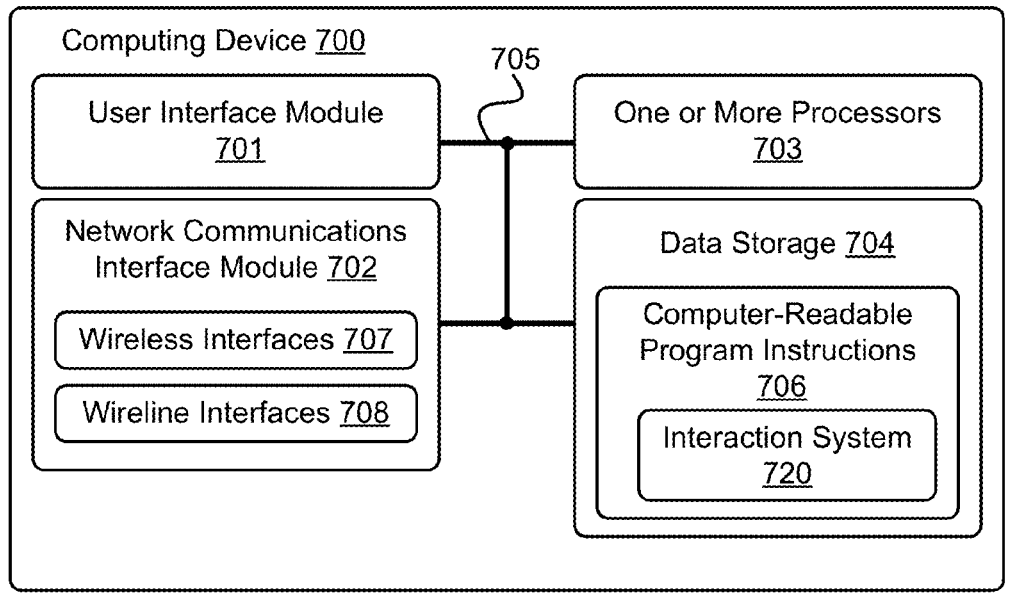
FIG. 7A is a functional block diagram of an example computing device, in accordance with an example embodiment.

FIG. 7A is a block diagram of a computing device (e.g., system) in accordance with an example embodiment. In particular, computing device 700 shown in FIG. 7A can be configured to perform one or more herein-described functions of the interaction system, user interfaces 100, 320, 324, active devices 312, 314, 316, handlers 320, 354, server devices 510, 608, 610, computing devices 540, 550, 560, and 700, programmable devices 604a, 604b, 604c, and computing clusters 709a, 709b, 709c, smartphones, smartwatches, HMDs, and/or method 800.

A computing device, such as computing device 700, can be or include any machine performing calculations automatically, and examples include, but are not limited to, desktop computers, laptop computers, tablets, mobile phones, smart phones, watches, smart watches, headsets, and HMDs such as smart glasses. A mobile computing device is any computing device that includes a mobile source of power, such as a battery—examples include, but are not limited to, laptop computers, tablets, mobile phones, smart phones, watches, smart watches, headsets, vehicle infotainment system, and HMDs. An immobile computing device is a computing device that is not a mobile computing device—examples include, but are not limited to, desktop computers, home entertainment systems, smart thermostats, and appliance computers. A wearable computing device is a computing device designed to be carried on and/or by a person or animal—examples include, but are not limited to, mobile phones, smart phones, watches, smart watches, headsets, and HMDs.

Computing device 700 may include a user interface module 701, a network-communication interface module 702, one or more processors 703, and data storage 704, all of which may be linked together via a system bus, network, or other connection mechanism 705.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network, such as network 606 shown in FIG. 6. Wireless interfaces 707 can include one or more short range and/or wide area wireless transmitters, receivers, and/or transceivers, such as a Bluetooth™ transceiver, a ZigBee™ transceiver, a Wi-Fi transceiver, a WiMAX transceiver, cellular, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 703 can include one or more general purpose processors and/or one or more special purpose processors (e.g., digital signal processors, application specific integrated circuits, etc.). Processors 703 can be configured to execute computer-readable program instructions 706 that are contained in the data storage 704 and/or other instructions as described herein.

Data storage 704 can include one or more computer-readable storage media that can be read and/or accessed by at least one of processors 703. The one or more computer-readable storage media can include volatile and/or non-volatile storage components, such as optical, magnetic, flash memory, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices. The one or more computer-readable storage media can be, or can include, one or more non-transitory computer-readable storage media.

Data storage 704 can include computer-readable program instructions 706 and perhaps additional data, such as but not limited to scripts, layouts, actions, operations, events, and/or software storage. In some embodiments, data storage 704 can additionally include storage required to perform at least part of the herein-described methods and techniques and/or at least part of the functionality of the herein-described devices and networks. In other embodiments, computer-readable program instructions 706 can include instructions for interaction system 720 that, when executed by processors 703, can cause computing device 700 to perform some or all of the herein-described functionality of an interaction system. In particular of these other embodiments, some or all of the additional data stored in data storage 704 can include one or more scripts executable by interaction system 720 to perform interaction-system functions, which can include at least some of the herein-described functionality of interaction system 720.

Cloud-Based Servers

Figure 7B:
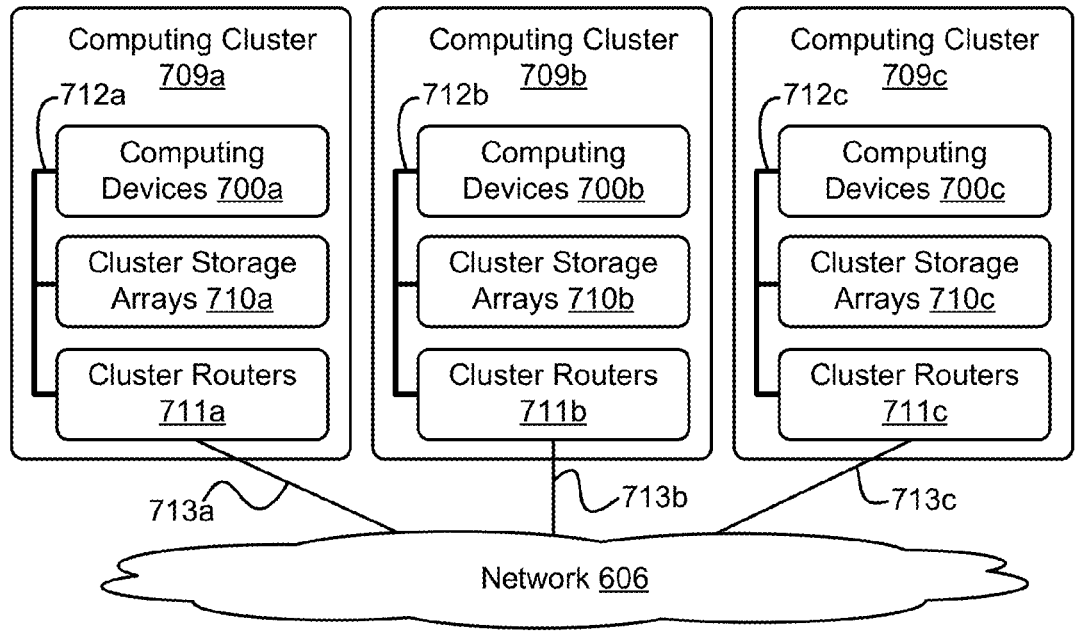
FIG. 7B depicts a cloud-based server system, in accordance with an example embodiment.

FIG. 7B depicts a network 606 of computing clusters 709a, 709b, 709c arranged as a cloud-based server system in accordance with an example embodiment. Server devices 608 and/or 610 can be cloud-based devices that store program logic and/or data of cloud-based applications and/or services; e.g. server devices 608 and/or 610 can perform some or all of the herein-described functionality of user interfaces 100, 320, 324, active devices 312, 314, 316, handlers 320, 354, server devices 510, 608, 610, computing devices 540, 550, 560, and 700, programmable devices 604a, 604b, 604c, and computing clusters 709a, 709b, 709c, smartphones, smartwatches, HMDs, and/or method 800.

In some embodiments, server device 608, server device 610, and/or interaction system 720, can include and/or be executed by a single computing device residing in a single computing center. In other embodiments, server device 608, server device 610, and/or interaction system 720, can include multiple computing devices in a single computing center, or even multiple computing devices located in multiple computing centers located in diverse geographic locations. For example, FIG. 6 depicts each of server devices 608 and 610 residing in different physical locations.

In some embodiments, data and services for server device 608, server device 610, and/or interaction system 720 can be encoded as computer readable information stored in non-transitory, tangible computer readable media (or computer readable storage media) and accessible by one or more other computing devices. In some embodiments, data at server device 608, server device 610, and/or interaction system 720 can be stored on a single disk drive or other tangible storage media, or can be implemented on multiple disk drives or other tangible storage media located at one or more diverse geographic locations.

FIG. 7B depicts a cloud-based server system in accordance with an example embodiment. In FIG. 7B, the functions of server device 608, server device 610, and/or interaction system 720 can be distributed among three computing clusters 709a, 709b, and 709c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of server 608. In one embodiment, the various functionalities of interaction system 720 can be distributed among one or more computing devices 700a, 700b, and 700c. Computing devices 700b and 700c in respective computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with server device 608, server device 610, and/or interaction system 720 can be distributed across computing devices 700a, 700b, and 700c based at least in part on the processing requirements of server device 608, server device 610, and/or interaction system 720, the processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server device 608, server device 610, and/or interaction system 720 can be distributed across computing devices 700a, 700b, and 700c of computing clusters 709a, 709b, and 709c, various active portions and/or backup portions of these components can be distributed across cluster storage arrays 710a, 710b, and 710c. For example, some cluster storage arrays can be configured to store the data of server device 608, while other cluster storage arrays can store data of server device 610.

Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 710a via the local cluster network 712a, and (ii) wide area network communications between the computing cluster 709a and the computing clusters 709b and 709c via the wide area network connection 713a to network 606. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design goals of the moderation system architecture.

Example Methods of Operation

Figure 8:
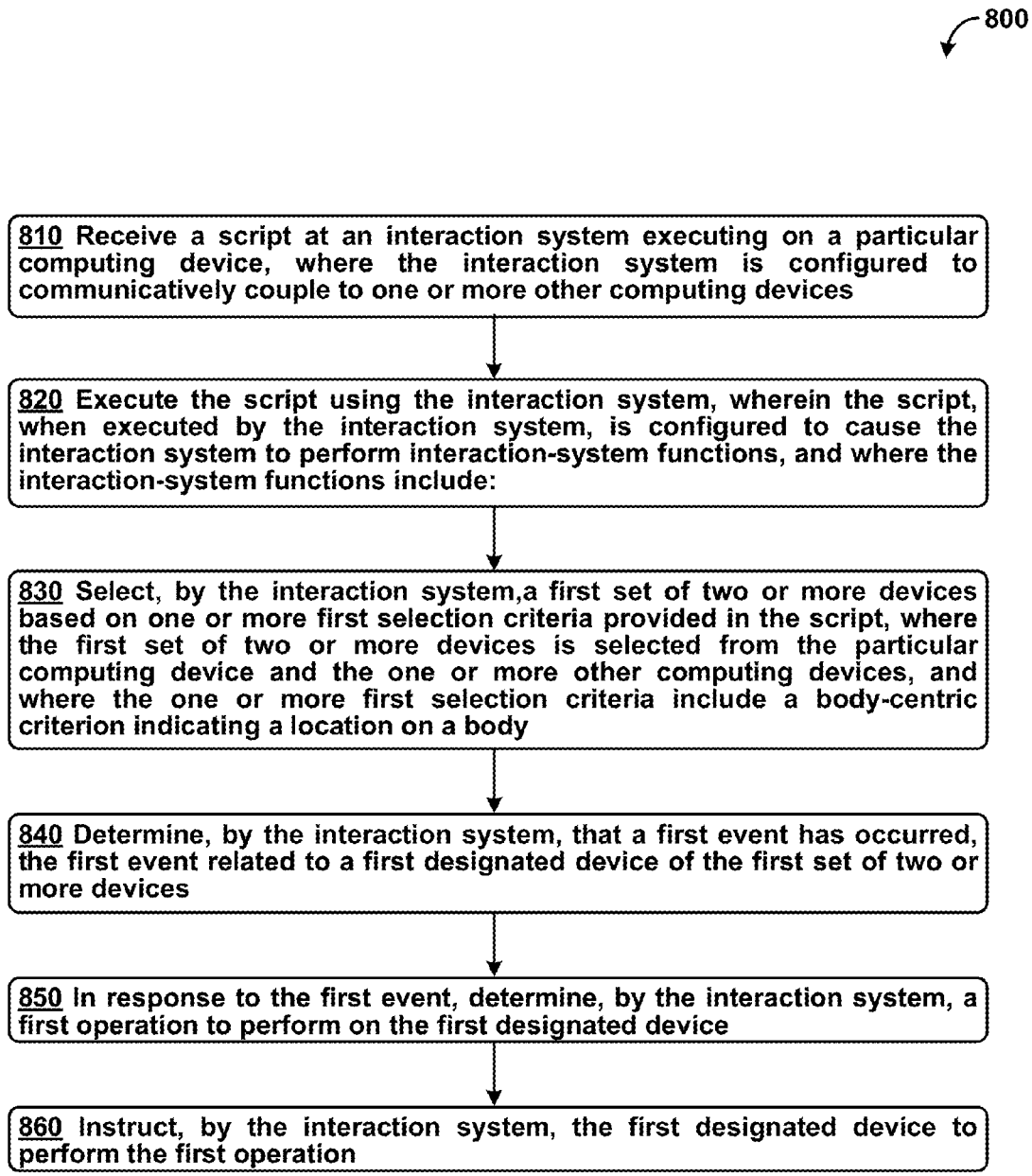
FIG. 8 is a flowchart for a method, in accordance with an example embodiment.

FIG. 8 is a flowchart of a method 800, in accordance with an example embodiment. Method 800 can be executed on a computing device. Example computing devices include, but are not limited to, herein-described active devices 312, 314, 316, handlers 320, 354, server devices 510, 608, 610, computing devices 540, 550, 560, and 700, programmable devices 604a, 604b, 604c, and computing clusters 709a, 709b, 709c, smartphones, smartwatches, and HMDs.

Method 800 can begin at block 810, where an interaction system executing on a particular computing device can receive a script, as discussed above in the context of at least FIGS. 1-5B. The interaction system can be configured to communicatively couple to one or more other computing devices, where the first set of two or more devices can include the particular computing device, as discussed above in the context of at least FIGS. 1-5B.

In some embodiments, at least one device of the first set of two or more devices can be a wearable device. In particular embodiments, the wearable device can be a device selected from the group of devices consisting of a smartphone, a smartwatch, and an HMD.

At block 820, the interaction system can execute the script, as discussed above in the context of at least FIGS. 1-5B. The script can, when executed by the interaction system, be configured to cause the interaction system to perform interaction-system functions. The interaction-system functions can include at least the functions of blocks 830-860, as discussed above in the context of at least FIGS. 1-5B.

In some embodiments, receiving the script can include: generating the script using a development user interface associated with the interaction system, and testing the script, by the development user interface, on one or more emulated devices configured to represent one or more corresponding devices in the first set of two or more devices. Then, executing the script can include executing the script after testing the script on the one or more emulated devices, such as discussed above in the context of at least FIG. 1. In some embodiments, receiving the script can include loading a script from a server (e.g., from an application store or developer website) onto a computing device, such as a smart phone. Then, executing the script can include executing the loaded script on the computing device; e.g., using the interaction system.

At block 830, the interaction system can select the first set of two or more devices based on one or more first selection criteria provided in the script, as discussed above in the context of at least Table 2 and FIGS. 1-5B. The one or more first selection criteria can include a body-centric criterion indicating a location on a body and/or a portion of a body where a device is worn; e.g., a criterion related to a joint discussed above at least in the context of Table 2.

In some embodiments, selecting the first set of two or more devices based on the one or more first selection criteria can include generating, by the interaction system, a representation of a combination of devices in the first set of two or more devices configured to operate as a single conceptual device, such as discussed above in the context of at least Tables 1 and 7. In other embodiments, selecting the first set of two or more devices based on the one or more first selection criteria can include generating, by the interaction system, a representation of all devices in the first set of two or more devices configured to treat all devices equally, such as discussed above in the context of at least Tables 1 and 6.

At block 840, the interaction system can determine that a first event has occurred, the first event related to a first designated device of the first set of two or more devices, as discussed above in the context of at least FIGS. 1-5B.

At block 850, in response to the first event, the interaction system can determine a first operation to perform on the first designated device, as discussed above in the context of at least FIGS. 1-5B.

In some embodiments, the first event can indicate an input has been received from a first device of the first set of two or more devices, where the input relates to selected media to be displayed using the interaction system on a second device of the first set of two or more devices based on the input, where the first device and second device differ, and where the first operation includes displaying the selected media on the second device.

At block 860, the interaction system can instruct the first designated device to perform the first operation using the interaction system, as discussed above in the context of at least FIGS. 1-5B.

In some embodiments, the interaction-system functions can further include: determining, by the interaction system, that a second event has occurred, the second event related to a second designated device of the first set of two or more devices, where the first designated device differs from the second designated device; in response to the second event, determining, by the interaction system, a second operation to perform on the second designated device; and instructing, by the interaction system, the second designated device to perform the second operation, as discussed above in the context of at least FIGS. 1-5B.

In other embodiments, the interaction-system functions can further include: selecting a second set of two or more computing devices communicatively coupled to the particular computing device, wherein the first set differs from the second set; determining, by the interaction system, that a third event has occurred, the third event related to a third designated device of the second set of two or more devices;

in response to the third event, determining, by the interaction system, a third operation to perform on the third designated device; and instructing, by the interaction system, the third designated device to perform the third operation using the interaction system, as discussed above in the context of at least FIGS. 1-5B.

In still other embodiments, a particular device in the first set of two or more devices can include one or more I/O device components. Then, the first set of selection criteria can include a selector keyword referring to an I/O device component of the one or more I/O device components. In particular of these embodiments, the one or more I/O device components can include an I/O device component selected from the group of I/O device components consisting of: a touchable I/O device component related to a touch input for a device, a showable I/O device component related to visible output of a device, a rotatable I/O device component related to a rotation of a device, and a shakeable I/O device component related to an acceleration of a device.

In even other embodiments, a pre-configured device is configured to store device-component information related to one or more I/O device components of the pre-configured device. Then, the interaction-system functions can further include: receiving, at the interaction system, at least part of the device-component information about the pre-configured device at the interaction system; and adding, by the interaction system, the pre-configured device to the first set of two or more devices using the device-component information about the pre-configured device.

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's physiology, medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
receiving a script at an interaction system executing on a particular computing device, wherein the interaction system is configured to communicatively couple to one or more other computing devices; and
executing the script using the interaction system, wherein the script, when executed by the interaction system, is configured to cause the interaction system to perform interaction-system functions, and wherein the interaction-system functions comprise:

selecting, by the interaction system, a first set of two or more devices based on one or more first selection criteria provided in the script, wherein the first set of two or more devices is selected from the particular computing device and the one or more other computing devices, and wherein the one or more first selection criteria comprise a body-centric criterion indicating a location on a body, determining, by the interaction system, that a first event has occurred, the first event related to a first designated device of the first set of two or more devices, in response to the first event, determining, by the interaction system, a first operation to perform on the first designated device, and instructing, by the interaction system, the first designated device to perform the first operation.

2. The method of claim 1, wherein the interaction-system functions further comprise:

determining, by the interaction system, that a second event has occurred, the second event related to a second designated device of the first set of two or more devices, wherein the first designated device differs from the second designated device;

in response to the second event, determining, by the interaction system, a second operation to perform on the second designated device; and instructing, by the interaction system, the second designated device to perform the second operation.

3. The method of claim 1, wherein the interaction-system functions further comprise:

selecting, by the interaction system, a second set of two or more computing devices communicatively coupled to the particular computing device, wherein the first set differs from the second set;

determining, by the interaction system, that a third event has occurred, the third event related to a third designated device of the second set of two or more devices;

in response to the third event, determining, by the interaction system, a third operation to perform on the third designated device; and instructing, by the interaction system, the third designated device to perform the third operation.

4. The method of claim 1, wherein at least one device of the first set of two or more devices is a wearable device.

5. The method of claim 4, wherein the wearable device is a device selected from the group of devices consisting of a smartphone, a smartwatch, and a head-mountable device (HMD).

6. The method of claim 1, wherein the first event indicates an input has been received from a first device of the first set of two or more devices, wherein the input relates to selected media to be displayed using the interaction system on a second device of the first set of two or more devices based on the input, wherein the first device and second device differ, and wherein the first operation comprises displaying the selected media on the second device.

7. The method of claim 1, wherein a particular device in the first set of two or more devices comprises one or more I/O device components, and wherein the first set of selection criteria comprise a selector keyword referring to an I/O device component of the one or more I/O device components.

8. The method of claim 7, wherein the one or more I/O device components include an I/O device component selected from the group of I/O device components consisting of:

a touchable I/O device component related to a touch input for a device, a showable I/O device component related to visible output of a device, a rotatable I/O device component related to a rotation of a device, and a shakeable I/O device component related to an acceleration of a device.

9. The method of claim 1, wherein a pre-configured device is configured to store device-component information related to one or more I/O device components of the pre-configured device, and wherein the interaction-system functions further comprise:

receiving, at the interaction system, at least part of the device-component information about the pre-configured device; and adding, by the interaction system, the pre-configured device to the first set of two or more devices using the device-component information about the pre-configured device.

10. The method of claim 1, wherein receiving the script comprises:

generating the script using a development user interface associated with the interaction system, and testing the script, by the development user interface, on one or more emulated devices configured to represent one or more corresponding devices in the first set of two or more devices;

and wherein executing the script comprises using the interaction system for:

executing the script after testing the script on the one or more emulated devices.

11. The method of claim 1, wherein selecting the first set of two or more devices based on the one or more first selection criteria comprises generating, by the interaction system, a representation of a combination of devices in the first set of two or more devices configured to operate as a single conceptual device.

12. The method of claim 1, wherein selecting the first set of two or more devices based on the one or more first selection criteria comprises generating, by the interaction system, a representation of all devices in the first set of two or more devices configured to treat all devices equally.

13. A computing device, comprising:

a processor; and a non-transitory computer readable medium configured to store executable instructions for at least an interaction system, wherein the interaction system is configured to communicatively couple to one or more other computing devices, and wherein the executable instructions, when executed by the processor, cause the interaction system of the computing device at least to perform functions comprising:

receive a script at the interaction system, and execute the script using the interaction system, wherein the script is configured to cause the interaction system to perform interaction-system functions, and wherein the interaction-system functions comprise:

selecting, by the interaction system, a first set of two or more devices based on one or more first selection criteria provided in the script, wherein the first set of two or more devices is selected from the computing device and the one or more other computing devices, and wherein the one or more first selection criteria comprise a body-centric criterion indicating a location on a body,
    determining, by the interaction system, that a first event has occurred, the first event related to a first designated device of the first set of two or more devices,
    in response to the first event, determining, by the interaction system, a first operation to perform on the first designated device, and
    instructing, by the interaction system, the first designated device to perform the first operation.

14. The computing device of claim 13, wherein the interaction-system functions further comprise:
    determining, by the interaction system, that a second event has occurred, the second event related to a second designated device of the first set of two or more devices, wherein the first designated device differs from the second designated device;
    in response to the second event, determining, by the interaction system, a second operation to perform on the second designated device; and
    instructing, by the interaction system, the second designated device to perform the second operation.

15. The computing device of claim 13, wherein the interaction-system functions further comprise:
    selecting, by the interaction system, a second set of two or more computing devices communicatively coupled to the computing device, wherein the first set differs from the second set;
    determining, by the interaction system, that a third event has occurred, the third event related to a third designated device of the second set of two or more devices;
    in response to the third event, determining, by the interaction system, a third operation to perform on the third designated device; and
    instructing, by the interaction system, the third designated device to perform the third operation.

16. The computing device of claim 13, wherein at least one device of the first set of two or more devices is a wearable device.

17. The computing device of claim 16, wherein the wearable device is a device selected from the group of devices consisting of a smartphone, a smartwatch, and a head-mountable device (HMD).

18. The computing device of claim 13, wherein the first event indicates an input has been received from a first device of the first set of two or more devices, wherein the input relates to selected media to be displayed using the interaction system on a second device of the first set of two or more devices based on the input, wherein the first device and second device differ, and wherein the first operation comprises displaying the selected media on the second device.

19. The computing device of claim 13, wherein a particular device in the first set of two or more devices comprises one or more I/O device components, and wherein the first set of selection criteria comprise a selector keyword referring to an I/O device component of the one or more I/O device components.

20. The computing device of claim 13, wherein the one or more I/O device components include an I/O device component selected from the group of I/O device components consisting of:
    a touchable I/O device component related to a touch input for a device,
    a showable I/O device component related to visible output of a device,
    a rotatable I/O device component related to a rotation of a device, and
    a shakeable I/O device component related to an acceleration of a device.

21. The computing device of claim 20, wherein a pre-configured device is configured to store device-component information related to one or more I/O device components of the pre-configured device, and wherein the interaction-system functions further comprise:
    receiving, at the interaction system, at least part of the device-component information about the pre-configured device; and
    adding, by the interaction system, the pre-configured device to the first set of two or more devices using the device-component information about the pre-configured device.

22. The computing device of claim 13, wherein receiving the script comprises:
    generating the script using a development user interface associated with the interaction system, and
    testing the script, by the development user interface, on one or more emulated devices configured to represent one or more corresponding devices in the first set of two or more devices;
    and wherein executing the script comprises using the interaction system for:
    executing the script after testing the script on the one or more emulated devices.

23. A non-transitory computer readable medium configured to store at least executable instructions, wherein the executable instructions, when executed by a processor of a computing device, cause the computing device to perform functions comprising:
    receiving a script at an interaction system executing on the computing device, wherein the interaction system is configured to communicatively couple to one or more other computing devices; and
    executing the script using the interaction system, wherein the script is configured to cause the interaction system to perform interaction-system functions, wherein the interaction-system functions comprise:
        selecting, by the interaction system, a first set of two or more devices based on one or more first selection criteria provided in the script, wherein the first set of two or more devices is selected from the computing device and the one or more other computing devices, and wherein the one or more first selection criteria comprise a body-centric criterion indicating a location on a body,
        determining, by the interaction system, that a first event has occurred, the first event related to a first designated device of the first set of two or more devices,
        in response to the first event, determining, by the interaction system, a first operation to perform on the first designated device, and
        instructing, by the interaction system, the first designated device to perform the first operation.

24. The non-transitory computer readable medium of claim 23, wherein the interaction-system functions further comprise:
    determining, by the interaction system, that a second event has occurred, the second event related to a second designated device of the first set of two or more devices, wherein the first designated device differs from the second designated device;

in response to the second event, determining, by the interaction system, a second operation to perform on the second designated device; and instructing, by the interaction system, the second designated device to perform the second operation.

25. The non-transitory computer readable medium of claim 23, wherein the interaction-system functions further comprise:

selecting, by the interaction system, a second set of two or more computing devices communicatively coupled to the particular computing device, wherein the first set differs from the second set;

determining, by the interaction system, that a third event has occurred, the third event related to a third designated device of the second set of two or more devices;

in response to the third event, determining, by the interaction system, a third operation to perform on the third designated device; and instructing, by the interaction system, the third designated device to perform the third operation.

* * * * *